(12) United States Patent
Matcham et al.

(10) Patent No.: US 12,300,011 B2
(45) Date of Patent: May 13, 2025

(54) SYSTEM AND METHOD FOR CLASSIFICATION OF UNSTRUCTURED TEXT DATA

(71) Applicant: Legal Utopia Limited, London (GB)

(72) Inventors: Fraser J. Matcham, Dover (GB); Vasilis Kotsos, London (GB); Markos Mentzelopoulos, London (GB)

(73) Assignee: Legal Utopia Limited, London (GB)

( * ) Notice: Subject to any disclaimer, the term of this patent is extended or adjusted under 35 U.S.C. 154(b) by 515 days.

(21) Appl. No.: 17/586,278

(22) Filed: Jan. 27, 2022

(65) Prior Publication Data

US 2022/0237934 A1 Jul. 28, 2022

(30) Foreign Application Priority Data

Jan. 27, 2021 (GB) .................................... 2101077

(51) Int. Cl.
*G06F 40/284* (2020.01)
*G06N 20/20* (2019.01)
*G06V 30/19* (2022.01)

(52) U.S. Cl.
CPC ...... *G06V 30/19173* (2022.01); *G06F 40/284* (2020.01); *G06N 20/20* (2019.01); *G06V 30/19147* (2022.01)

(58) Field of Classification Search
CPC ...... G06F 40/284; G06F 40/10; G06F 40/151; G06F 40/16; G06F 40/20; G06F 40/205; G06F 40/211; G06F 40/279; G06F 40/295; G06F 40/30; G06F 40/40; G06F 40/58

USPC ................................. 704/9, 1, 2, 4, 10, 257
See application file for complete search history.

(56) References Cited

U.S. PATENT DOCUMENTS 10,963,636 B1 * 3/2021 Kumar .................. G06F 40/205
12,001,862 B1 * 6/2024 Liu ........................ G06F 16/904
2020/0136890 A1 * 4/2020 To ........................ H04L 43/0852

OTHER PUBLICATIONS

Enghish Translation of CN 112148868 A (Dec. 29, 2020).*
Lao et al., "Classifying Legal Questions into Topic Areas Using Machine Learning", Stanford University, CA. 2014.
Bird et al., "Natural Language Processing with Python", O'Reilly Media, Inc., Sebastopol, CA. Jun. 2009.

* cited by examiner

*Primary Examiner* — Qi Han
(74) *Attorney, Agent, or Firm* — Jordan IP Law, LLC

(57) ABSTRACT

Certain examples described herein provide a system for classification of unstructured text data relating to a legal query. The system has a session interface to receive session data relating to the legal query, a text interface to receive unstructured text data from a user, a text pre-processor to apply one or more text pre-processing functions to the unstructured text data to output a structured numeric representation of the unstructured text data, at least one machine learning classifier to map the structured numeric representation of the unstructured text data to one or more classes within a defined set of classes, and a classifier optimizer to process the session data to generate configuration data for the at least one machine learning classifier, the configuration data indicating a subset of the defined set of classes that are valid given the session data.

17 Claims, 16 Drawing Sheets

"Your help is much appreciated. My partner/ex partner are both intelligent people (relatively) and we cannot agree. We have a company with 4 properties in it. Originally we split the properties and it was fair- he took two, I took two. Fast forward 1.5 years. We found it was too expensive/complicated to actually legally split up the company. My two properties went up in value in the 1.5 years by 150,000 more than his- by luck. He wants to give me 150,000 in business money from another company of his to put into another company of mine...and then we will be even again and 50/50 in the old company. Make sense? BUT...my partner is wanting to deduct the future capital gains tax from the 150,000 and give me a lesser number. He is saying he will have to pay this in the future when the property/s sell. Is this correct???...."

[your help much appreci partnerex partner intellig peopl rel cannot agre compani properti origin split properti fair took two took two fast forward year found expensivecompl actual legal split compani two properti went valu year luck He want give busi money anoth compani put anoth compani mineand even old compani make sens but mi partner want deduct futur capit gain tax give lesser number He say pay futur properti sell Is correct]

| Variable | Data | |
|---|---|---|
| Session_ID | 1234567 | |
| Account_ID | 9876543 | |
| Role | claimant | 752 |
| Remedy | legal_advice | |
| Status | pre_action | |
| Original_Text | "..." | 754 |
| Token_Count | 130 | 756 |
| Text_Vector 758 | [0.05, 0.09, ..., 0.35, 0.21, ...] | |
| Domain_Data 760 | [{C: 0, D:contract_law, V: F}, {C: 1, D:family_law, V: T}] | |
| Sub_Domain_Data 762 | [{C: 0, D:divorce, V: F}, {C: M, D:child_arrang, V: T}] | |
| Validated_Scenario | 11223344 | 764 |

750

```
{
account_type: {business, individual},
role: {advisory_client, claimant,
creditor, defendant, appellant,
respondent, petitioner, witness,
complainant, executor},
remedy: {damages, court_order, settlement,
legal_advice, injunction, declaration},
Status: {raised_informal, raised_formal,
pre_action, negotiation, proceedings,
advisory}
}
```

SYSTEM AND METHOD FOR CLASSIFICATION OF UNSTRUCTURED TEXT DATA

TECHNICAL FIELD

The present invention relates to a system and a method for the classification of unstructured text data using one or more machine learning classifiers. As such, the present invention relates to machine learning and, in particular, the sub-field of natural language processing. The examples are presented as an application for legal query processing. In particular, certain embodiments of the present invention allow for the classification of unstructured text data where the possible classifications are non-exhaustive. They thus provide a semi-supervised classification solution that is practically implementable.

BACKGROUND

Within the field of computer engineering, machine learning approaches seek to provide technical systems that provide human-like intelligence and behaviour. While many human behaviours seem instinctive or simple from a human perspective, engineers have realised that the technical systems required to mimic these behaviours are incredibly complex. Also, many of the concepts that human beings take for granted in normal everyday experience have no clear technical analogue. Hence, just knowing a high-level human description of a process is not enough to build a technical system to implement that process, and computer and machine learning engineers often need to start from scratch to design such systems.

Machine learning is split into different sub-fields. These include image processing and classification, audio processing and text-to-speech mapping, and natural language processing. The latter sub-field aims to provide approaches for the processing of unstructured text data (also referred to as "raw text"). For example, at a technical level, text data is encoded as a sequence of characters. A common encoding standard used in most technical implementations is the Unicode standard as maintained by the Unicode Consortium of California, United States of America. The Unicode standard offers different byte-level encodings of characters within text, basically a mapping of known letter and punctuation symbols to integer values that are then encoded as one or more bytes of binary data. When a computing device receives unstructured text data, it is receiving, at a technical level, a serial stream of byte encodings representing characters within the unstructured text data. This may be contrasted with structured text data, such as JavaScript Object Notation (JSON) where a series of fields are defined and values for those fields specified using a machine-readable syntax. For example, the JSON data {"firstName": "John", "secondName": "Smith"} allows values for the firstName and secondName defined fields to be extracted but the raw text "John Smith" has no such field mapping.

The textbook Natural Language Processing with Python by Steven Bird, Ewan Klein, and Edward Loper (O'Reilly Media 2009) which is incorporated herein by reference, sets out approaches for the processing of unstructured text data using the Python programming language using an accompanying set of downloadable function modules. The textbook describes approaches for processing and classifying raw text.

One area where natural language processing may be applied is law. The realm of law is the realm of the written word, such that most of the data used within legal applications is in an unstructured form (e.g., very long sequences of character encodings within word processing file formats). Although there have been efforts to introduce more structured forms of text data, such as eXtended Markup Language (XML) or Structured Query Language (SQL) databases, these have typically only been suitable for limited sets of clearly defined biographical information, such as names and dates. The bulk of the information content still resides within unstructured "free text" fields.

The paper "Classifying Legal Questions into Topic Areas Using Machine Learning" by Brian Lao and Karthik Jagadeesh (Project Paper 2014 published on the Stanford University Machine Learning website), which is incorporated herein by reference, describes approaches for classifying legal questions into the most relevant practice area using machine learning techniques including logistic regression, multinomial Naïve Bayes, support vector machines and single layer neural networks. The approaches were applied to over 200,000 user-asked free-text legal questions that were obtained from the Internet. Although relatively high accuracy was seen on a training set of 150,000 questions, performance on a test set of 50,000 questions was much reduced, with maximum test accuracy lying below 70%.

The difficulty in obtaining high accuracy on test data demonstrates a technical problem that is faced by the machine learning engineer when constructing a technical system to process and classify free text, for example in the form of a description of a legal query or question. In particular, many comparative systems struggle where there is a non-exhaustive list of classifications to apply to a free-text field, i.e., cases that could incorporate classifications which the classifier is not trained on. There is also the issue that noise within unstructured text data also causes feature selection to perform poorly, e.g., as possible input selections via the unstructured text data are much higher dimensionality than the number of classes to be selected. For the technical system to be used within a production data processing pipeline (e.g., as a pre-processing stage for an Internet-based service), accuracy needs to be over 90%. There is thus a desire for an improved free text processing and classification system for use within a legal technology system.

SUMMARY

Aspects of the present invention are set out in the appended independent claims. Certain variations of the invention are then set out in the appended dependent claims. Further aspects, variations and examples are presented in the detailed description below.

BRIEF DESCRIPTION OF THE DRAWINGS

Examples of the invention will now be described, by way of example only, with reference to the accompanying drawings, in which:

FIGS. 7A to 7F are examples of data as processed by the legal classification systems of the first and second embodiments.

DETAILED DESCRIPTION

Introduction

Figure 1:
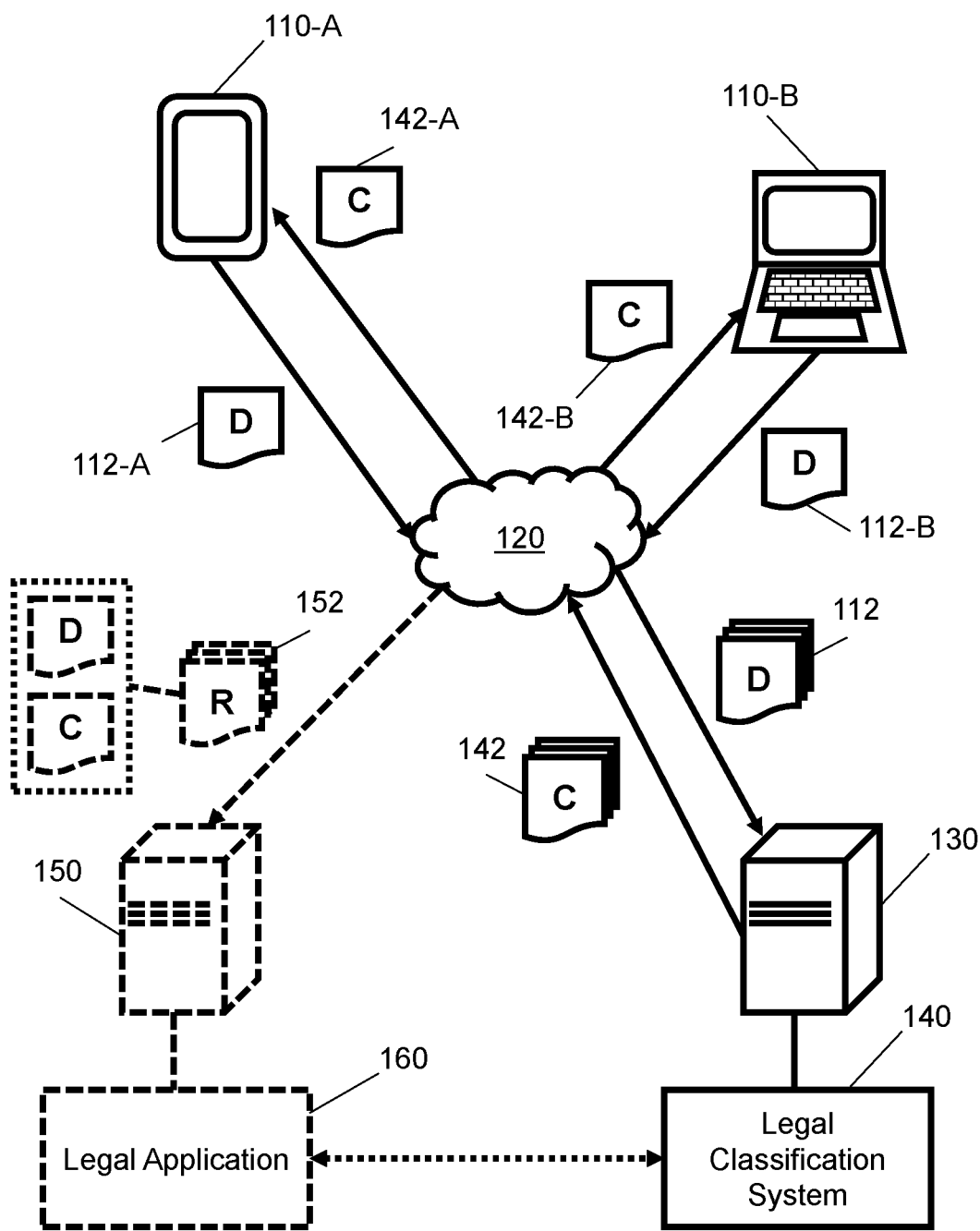
FIG. 1 is a schematic diagram of an example legal classification system that is implemented over a set of computer networks.

Certain examples described herein provide methods and systems for classifying unstructured text data. As described above, unstructured text data may comprise bytes of encoded characters that may be entered freely by a user of a computing device. Classification as described herein refers to the process of mapping the unstructured text data to one or more of a set of class labels or identifiers. A classification output may be provided in the form of a determined single class label or identifier, or in the form of a vector of numeric values, where each value represents a probability or logit for a class that is associated with the particular element of the vector. In numeric terms, classification may be considered a problem of reducing a high-dimensionality data structure or array that represents the unstructured text data to a low-dimensionality data structure or array that represents a predefined set of classes, where these may not comprise all available classes in cases where a cascade of classifiers is used. Classification as described herein is presented as a machine learning problem where the classification is performed by a computer system rather than a human being. It should be noted that within the cognitive capacity and intelligence of a human-being, performing the same task of the described computing systems would be impossible within a predefined processing time (e.g., the milliseconds required for an acceptable local or network response), especially considering the depth of calculation and the number of possible outputs. Furthermore, when actually implementing an engineering system, the approach and methods of the present examples are entirely dissimilar to human cognitive approaches.

Certain examples described herein are presented in the form of a legal classification system that takes as input unstructured text data and outputs classification data representing the determined class or classes. In a legal field, the classes may represent areas of the law, or legal expertise that is required to address a legal query presented within the unstructured text data. The legal classification system may form part of a distributed mobile computing application (colloquially referred to as an "app"). This may comprise dedicated local executable programming code (e.g., an application installed on a local computing device) and/or browser-based access to server-implemented functions (e.g., a so-called "web-based" computing application that is accessed via the Internet). The systems and methods presented herein allow for accuracies of above 90% on test data sets, indicating a suitability for integration into a production-level distributed application for use in the real-world. Technical features that describe this increase in accuracy are discussed in the description below. They include a hierarchical classification approach, use of multiple classifiers of different types, validation loops, classification optimization and data optimization. These features interact synergistically, e.g., the advantages of any combination of two of more technical features, e.g., in terms of increase accuracy, are greater than the sum of the individual advantages when used independently. This is because the features are usable as part of a processing pipeline, such that later components process the result of earlier components, where advantages compound. The legal classification system may be considered analogous to a search engine, albeit one where a longer form unstructured text input is provided and mapped to legal categories that allow assignment of the legal query to differently engineered legal processing systems. Although reference is made to a legal classification system, in other examples, the approaches described herein may be applied to any general unstructured text classification system, such as any classification system that processes questions or descriptions in "natural" freely entered user text. For example, in certain examples, the approaches may be validly generalised to any field with expert knowledge, such as those relating to professions including medicine and engineering, where lay users require a mapping of jargon-free text to a specific sub-domain of the field.

While examples are discussed with an unstructured text input, it should be noted that these examples are particularly well-suited to use with voice control systems, such as voice assistants. For example, voice assistants may use a speech-to-text system that converts a spoken query into free text. This free text may thus form the unstructured text input of the examples. The output of the classification may also be provided via a text-to-speech interface of the voice control system. Furthermore, the unstructured text data described herein may comprise an output of a translation pre-processing system. For example, a user may enter free-text in a first native language (such as French or Mandarin) and this may be translated, e.g., using automated translation systems based on neural network sequence-to-sequence models, into a second language (such as English) that is used for classification. This may be applied independently or in combination with speech-to-text systems. This may also be used as a general pre-processing stage (e.g., US English into UK English) to reduce the later token dimensionality.

In certain examples, a system for classification of unstructured text data is provided. The system comprises at least a text pre-processor to apply one or more text pre-processing functions to unstructured text data to output a structured numeric representation and at least one machine learning classifier to map the structured numeric representation of the unstructured text data to one or more classes. The system may be adapted with multiple layers of classifications (e.g., domain and sub-domain) as well as multiple iterations of classifications (e.g., by classifiers of different types with possibly different classes).

In one case, the system further comprises a session interface to receive session data relating to the classification and a classifier optimizer to process the session data to generate configuration data for the at least one machine learning classifier. The configuration data is used to modify the operation of the at least one machine learning classifier. This may be performed in multiple ways. In one case, the session data may be provided as additional input that is processed together with the structured numeric representation to generate a modified output compared to a case where the structured numeric representation is received alone. In another case, the session data may be used to modify an initial output of the at least one machine learning classifier based on the structured numeric representation, e.g., by weighting an output probability or logit vector. In general, the configuration data may indicate a subset of a defined set of classes that are valid for any one machine learning classifier given the session data. The "valid" classes may be indicated discretely, e.g., such that certain classes are excluded, and/or probabilistically, e.g., where a weighting may increase or decrease an initial probability or logit value to indicate that the class is more or less likely given the session data.

Figure 3A:
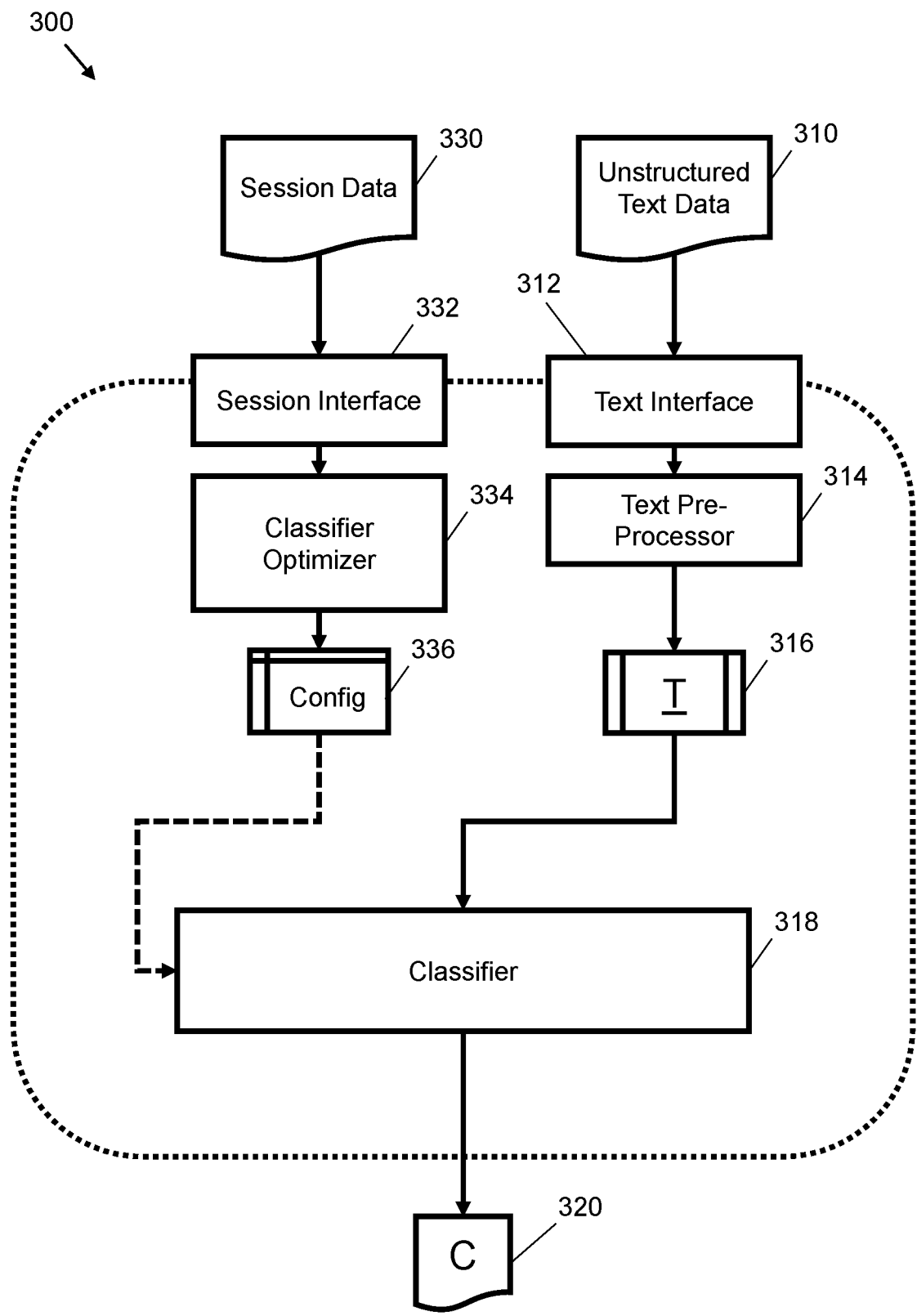
FIG. 3A is a schematic diagram showing a first set of example components for a second embodiment of a legal classification system.
Figure 3B:
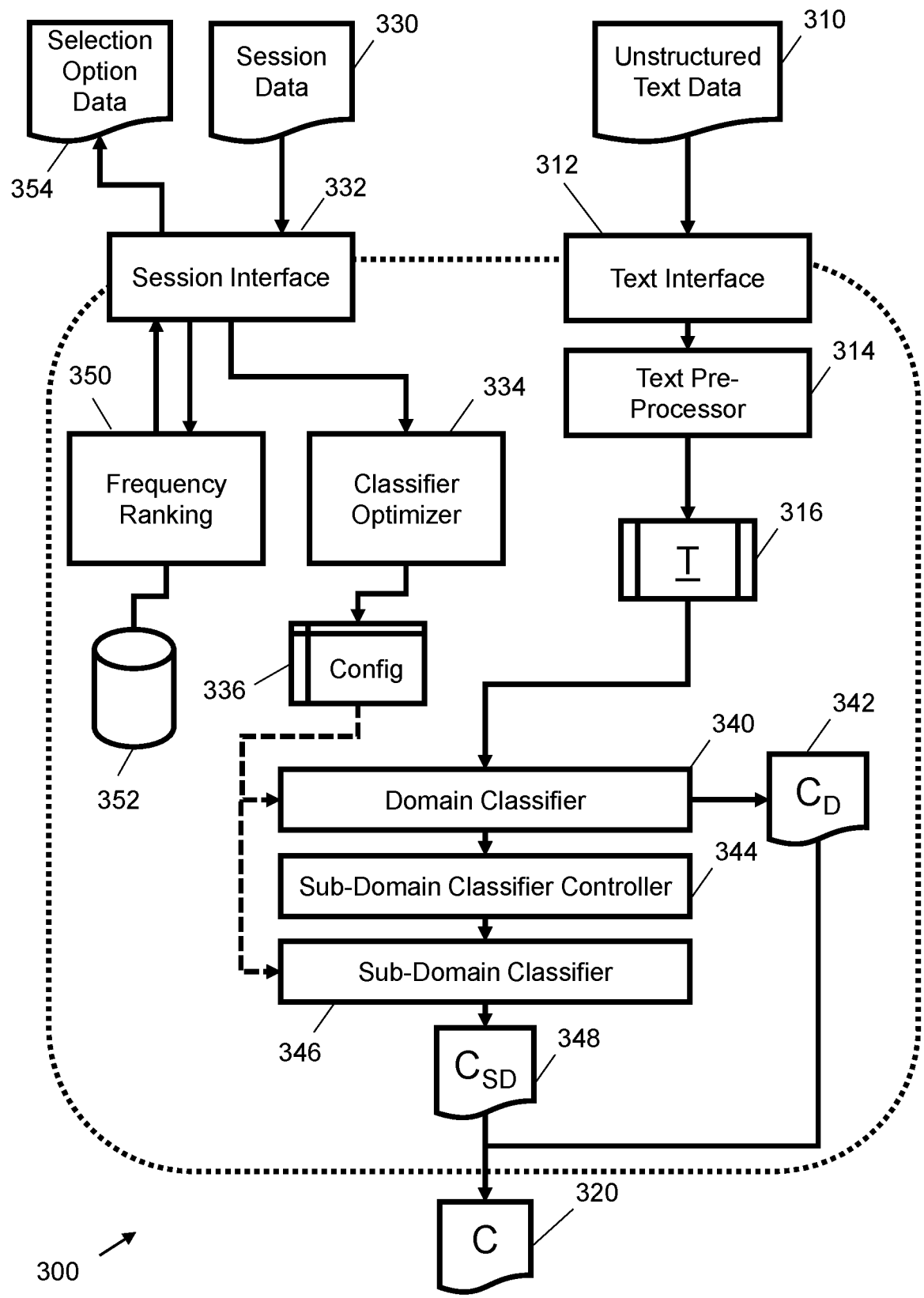
FIG. 3B is a schematic diagram showing a second set of example components for a second embodiment of a legal classification system.

The approaches described herein may be applied independently but have particular synergetic effect when implemented collectively (e.g., the systems of FIG. 3A or 3B with the validation loops of FIG. 4A to 4C or 4D). They present an engineer-designed solution to a specific machine learning challenge that global industry is facing. The proposed technical implementations can easily be applied to a variety of apparatuses. They are of particular benefit where a supervised-learning element is non-exhaustive to the known number of possible classifications (i.e., semi-supervised process systems). The technical implementations described herein specifically target the technical challenges of accuracy, whilst also providing semi-supervised self-learning elements (e.g., in the form of optimised classifiers that are cascaded within validation loops) without undermining the commercial viability of the application of the technology. At present, some of the biggest challenges for the use and application of natural language classification to data corpuses is the number of variables to account for versus the rate of accuracy; particularly where those variables include classification outputs that are known by the machine learning engineer but are not present in the training data yet. The validation process described herein allows this data to be efficiently collected while the system is operational (i.e., bootstrapped), overcoming the technical hurdle whilst maintaining self-learning and increasing accuracy over time and use.

Certain Term Definitions

The terms "data" and "stream", and "input" are used in different contexts herein to refer to digital information. Unstructured text data may be received as binary representations (e.g., in one or more bytes) of positive (i.e., unsigned) integer values that represent particular characters within a language. Unstructured text data may be encoded as characters using one or more known character encoding standards, such as one of the defined Unicode standards or the American Standard Code for Information Interchange (ASCII) standard. Unstructured text data may be packaged for transmission over one or more computer networks that form part of a distributed computing application.

The term "interface" is used herein to refer to any physical and/or logical interface that allows for one or more of data input and data output. An interface may be implemented by retrieving data from one or more memory locations, as implemented by a processor executing a set of instructions. An interface may also comprise physical couplings over which data is received. An interface may comprise an application programming interface and/or a method call or return. For example, in a software implementation, an interface may comprise passing data and/or memory references to a function initiated via a method call, where the function comprises computer program code that is executed by one or more processors; in a hardware implementation, an interface may comprise a wired interconnect between different chips, chipsets or portions of chips. In the drawings, an interface may be indicated by a boundary of a processing block that has an inward and/or outward arrow representing a data transfer.

The terms "component" and "module" are used interchangeably to refer to either a hardware structure that has a specific function (e.g., in the form of mapping input data to output data) or a combination of general hardware and specific software (e.g., specific computer program code that is executed on one or more general purpose processors). A component or module may be implemented as a specific packaged chipset, for example, an Application Specific Integrated Circuit (ASIC) or a programmed Field Programmable Gate Array (FPGA), and/or as a software object, class, class instance, script, code portion or the like, as executed in use by a processor.

In certain examples, the unstructured text data is described as part of a "legal query". In certain preferred examples, the unstructured text data comprises a short free-text description (e.g., 100-200 words). Hence, these examples provide more than a comparative search engine that may receive 1-3 key terms as input. The unstructured text data may take any form, may include explicit or implicit questions, and need not be grammatically "correct". The methods described herein thus are applicable to unstructured text data that comparative systems are not able to process, these comparative systems generally requiring either a few short key words or "well-formed" grammatical sentences that may be parsed using rule-based methods. These comparative rule-based methods are typically an attempt to copy the human actions on text. However, these attempts typically fail, with poor classification accuracy and difficulty coping with noise. The present methods and systems are also scalable to process large portions of unstructured text data, including multi-page documents and report. In examples, the unstructured text data is provided by non-professionals, e.g., lay users that have no knowledge of the terminology of any one professional field. Indeed, even a professional lawyer would take an alternative approach to assessing the classification of a query than that described herein, e.g., especially if it was not in discernible standard English. Reference to a legal query as used herein covers any unstructured text data as described above. Methods and systems may also be applied to fields outside of law, such as medicine or engineering disciplines, where unstructured text data is provided as input.

The term "session data" is used to refer to data that accompanies a legal query session undertaken by a user. This may be seen as analogous to a web-browser session, where, in the present case, the session refers to an interactive information exchange between a client computing device and a server computing device that implement a distributed application. The session data may comprise user data (i.e., data identifying a user performing the legal query and/or data indicating properties or characteristics of that user as may be found within user account data) as well as one or more initial selections made by the user via a user interface.

The session data may be provided directly (e.g., explicitly received over a network) and/or may be retrieved based on received identifying data (e.g., output by a look-up or configuration retrieval operation). The one or more initial selections may comprise initial selection of user properties that relate to the legal query prior to the classification of unstructured text data. The session data may thus comprise a history of interactions between a client computing device presenting a user interface and a server computing device providing the data for the user interface. Session data may be provided as structured data such as selections from one or more lists of values. Session data may comprise string or numeric data representing the selections (e.g., in the latter case, indexes representing a position of the value within a predefined list). The session data is used in examples herein to determine probable characteristics of the accompanying legal query. For example, the session data may be processed to profile the legal query (e.g., based on characteristics of a user). In this case, the example methods and systems described herein assess the probability or correlation of the characteristics of the user to characteristics or patterns connected to a particular classification or scenario of a classification; this can then be used, in certain cases with other bodies of historical data, to identify relevant or non-relevant classifications.

The term "structured numeric representation" is used to refer to numeric data in a structured form, such as an array of one or more dimensions that stores numeric values with a common data type, such as integers or float values. A structured numeric representation may comprise a tensor (as used within machine learning terminology). A structured numeric representation is typically stored as a set of indexed and/or consecutive memory locations, e.g., a one-dimensional array of 64-bit floats may be represented in computer memory as a consecutive sequence of 64-bit memory locations in a 64-bit computing system.

The term "machine learning classifier" is used herein to refer to at least a hardware-executed implementation of a machine learning model or function. Known classifiers within the field of machine learning include logistic regression classifiers, Naïve Bayes classifiers, Random Forests, Support Vector Machines and artificial neural networks. Implementations of classifiers may be provided within one or more machine learning programming libraries including, but not limited to, scikit-learn, TensorFlow, and PyTorch.

The term "map" is used herein to refer to the transformation or conversion of a first set of data values to a second set of data values. In the context of classification, the two sets of data values may be arrays of different sizes, with an output array being of lower dimensionality than an input array. The input and output arrays may have common or different data types. The size of the output array represents a set of available classes, where each element in the array represents a different class. In natural language approaches the names of the classes are immaterial, as long as there is a consistent mapping between class labels and array elements in both training and test (i.e., inference or use) data. In the descriptions herein, the term "classes" is used to refer to the technical representation of a set of classes, such as an output array. In training data, a particular class may be indicated using a one-hot vector (i.e., a vector with all zeros apart from the element representing the assigned class, which is set to 1).

The term "optimizer" is used herein to refer to at least a hardware-executed component that controls one or more of input data entry and classifier function. This control may be provided via the provision of "configuration data". In the classifier case, the configuration data may control the configuration of the classifier, e.g., by ignoring indicated outputs and/or restricting a set of output classes.

Example Distributed Computing Application

FIG. 1 shows an example of a distributed computing system 100 over which a legal classification service may be provided. The distributed computing system 100 is configured according to a client-server configuration that comprises one or more client computing devices 110 that are connected, over one or more data communication networks 120, to at least one server computing device 130 that executes a legal classification system 140. The set of data communications networks 120 may comprise one or more interconnected communications networks, including wired and wireless networks. The set of client computing devices may comprise mobile telecommunication devices 110-A (including so-called "smart phones") and laptop or desktop computers 110-B. The server computing device 130 comprises at least one processor and memory with loaded computer program code, and/or dedicated chipsets, that implement the legal classification system 140. The legal classification system 140 may provide an application programming interface (API) that is accessible over the Internet. Communication over the set of data communications networks 120 may be secured (e.g., using Transport Layer Security).

In these examples, a user of one of the client computing devices 110 interacts with a user interface provided on the computing device to provide data 112 across the networks 120. This data 112 may comprise at least unstructured text data representing a legal query that is entered by the user (e.g., using a virtual or physical keyboard, or via a speech-to-text voice interface). Data from multiple users may be received by the server computing device 130 over the networks 120. The data 112 is passed to an interface of the legal classification system 140 which applies one or more machine learning classifiers to determine a classification 142 of the unstructured text data. This classification 142 may be returned to the client computing devices 110 for further use in a processing pipeline and/or passed to additional server computing devices 150 for further processing. In certain variations described in more detail below, a user provides validation of the classification 142 within one or more iterative loops.

In one example, the client computing devices 110 may implement a front-end of the distributed computing system 100 and the legal classification system 140 may implement a back-end of the same system 100. In one case, the unstructured text data may be provided as a "free" or "raw" text field within JSON data that is communicated to the legal classification system 140 as an API request over HyperText Transfer Protocol Secure (HTTPS). The classification 142 is then provided as a further JSON response.

FIG. 1 shows an optional legal application 160 that may be implemented on an additional server computing device 150. The legal application 160 may be implemented by the same entity that implements the legal classification system 140 or by a different entity. If the legal application 160 is implemented by the same entity, then the legal classification system 140 and the legal application 160 may communicate directly as indicated by the dashed line. In certain cases, the legal classification system 140 and the legal application 160 may be implemented on a common server computing device. In other cases, the client computing devices 110 may forward at least the classification 142 as request data 152 to the additional server computing device 150 for use by the legal application 160. In certain cases, the request data 152 may also contain the original data 112 from the user.

First Example Embodiment

Figure 2A:
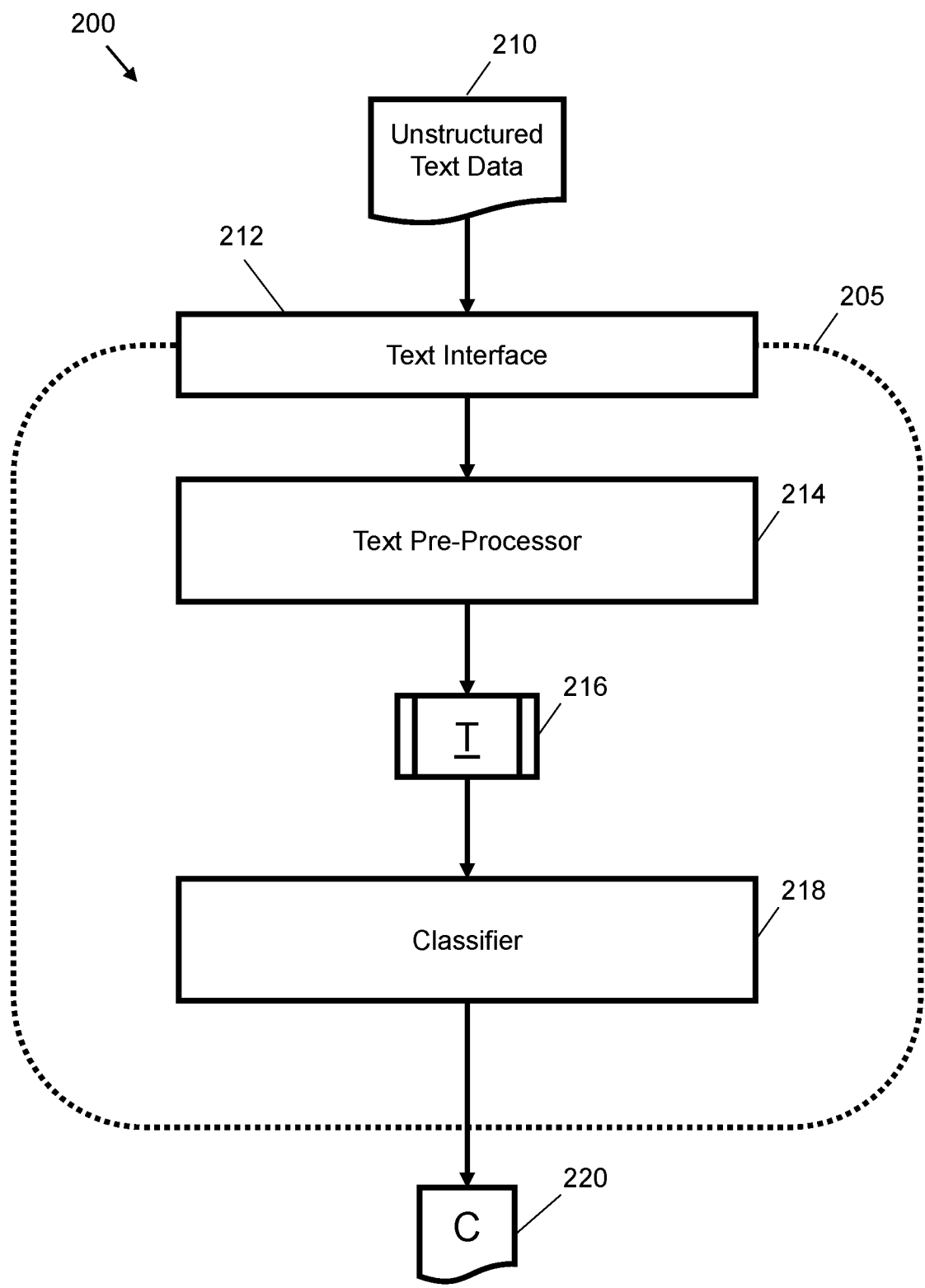
FIG. 2A is a schematic diagram showing a first set of example components for a first embodiment of a legal classification system.
Figure 2B:
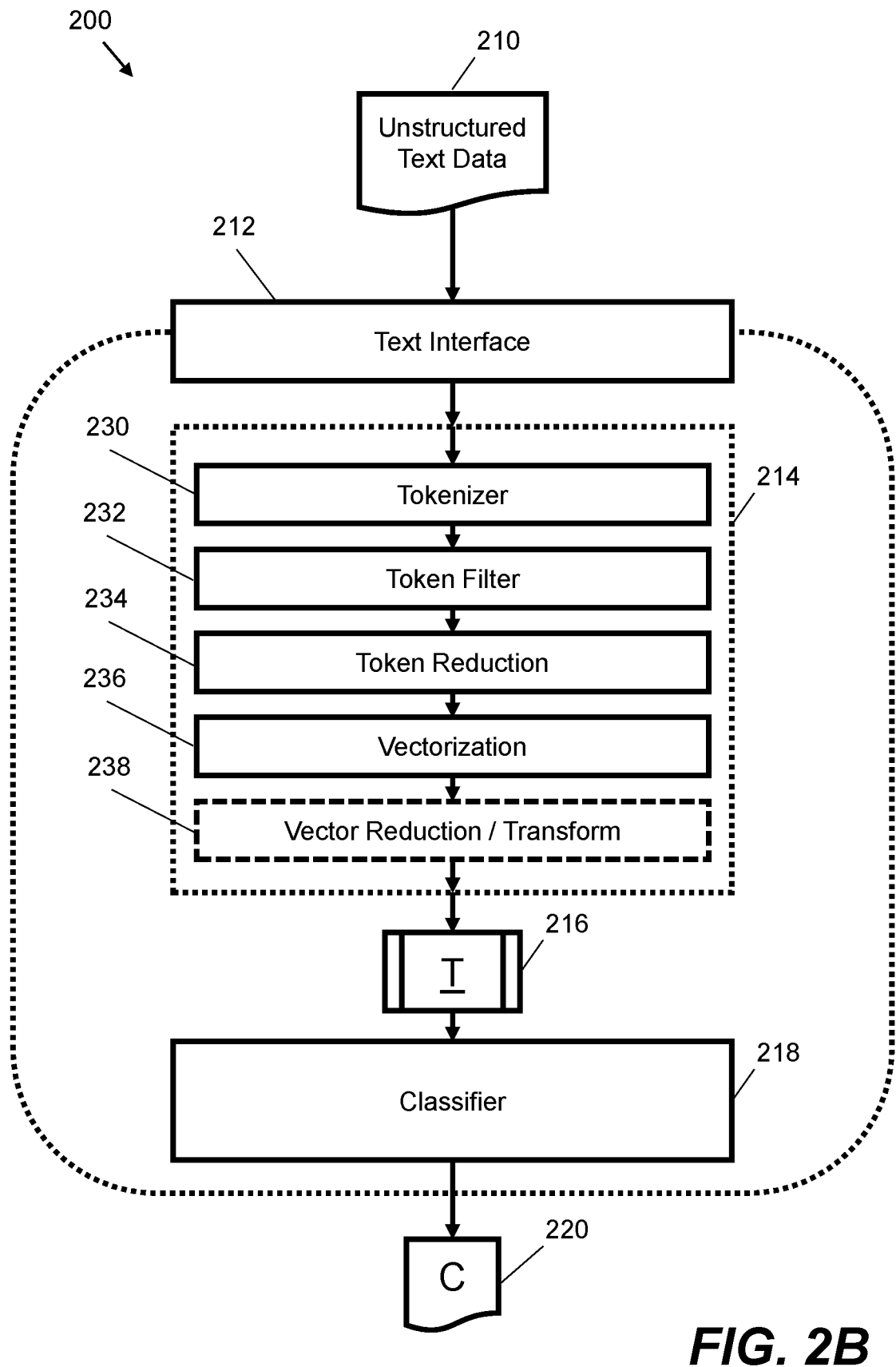
FIG. 2B is a schematic diagram showing a second set of example components for the first embodiment of the legal classification system.
Figure 2C:
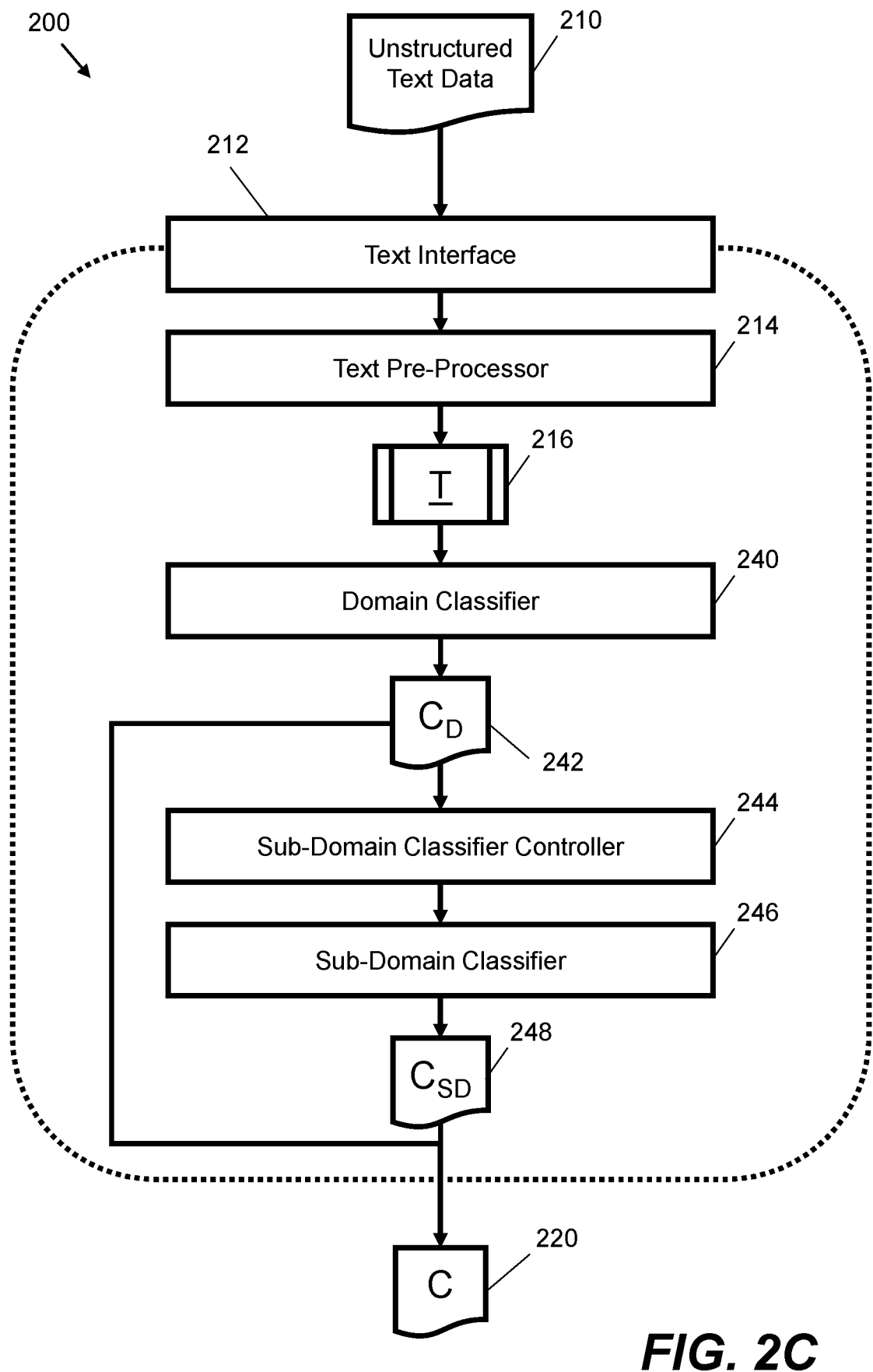
FIG. 2C is a schematic diagram showing a third set of example components for the first embodiment of the legal classification system.

FIGS. 2A to 2C show different variations of a first example embodiment of a legal classification system 200. The legal classification system 200 may be implemented using the distributed computing system 100 shown in FIG. 1. Examples will be described with reference to the legal classification system 200 being implemented upon a server computing device 205 such as server computing device 130 in FIG. 1. However, as with other distributed systems, functionality may be located at different devices within the distributed computing system 100 whilst still retaining a common process flow.

The legal classification system 200 receives unstructured text data 210 and outputs classification data 220. The unstructured text data 210 may comprise the data 112 that is transmitted over the network 120 in FIG. 1. The classification data 220 may comprise a determined class label and/or a classification vector as described above. In FIG. 2A, the legal classification system 205 comprises a text interface 212 and a text pre-processor 214. The text interface 212 receives unstructured text data from a user. The text interface 212 may comprise an API provided by the legal classification system 200, as implemented using a hardware network interface. For example, the unstructured text data 210 may be received as part of JSON request data transmitted from a client device. The text interface 212 may apply processing such as network decoding and/or unpackaging to provide access to an underlying sequence or stream of character encodings.

The text pre-processor 214 is configured to apply one or more text pre-processing functions to the unstructured text data as received and output by the text interface 212 to output a structured numeric representation 216 of the unstructured text data. For example, the text pre-processor 214 may receive the unstructured text data as a sequence of character encodings (e.g., successive 1, 2 or 4-byte values) and convert this to a structured numeric representation 216 in the form of a numeric input vector of a predefined length. Further description of this process is set out later with respect to FIG. 2B.

The legal classification system 200 also comprises at least one machine learning classifier 218. This classifier 218 acts to map the structured numeric representation 216 to one or more classes within a defined set of classes. The output of the classifier 218 forms the classification data 220. The classifier 218 may be configured using a set of parameter values that result from a training of the classifier 218 with a set of training data. The training data may comprise pairs of structured numeric representations 216 (or unstructured text data to be converted to said representations) and output class vectors with one-hot encodings to represent a particular class.

FIG. 2B shows certain sub-components that may be used to implement the text pre-processor 214. The text pre-processor 214 may be constructed modularly and certain sub-components may be omitted or substituted for certain implementations. In the example of FIG. 2B, the text pre-processor 214 comprises a tokenizer 230, a token filter 232, a token reduction component 234, a vectorization component 236 and a vector reduction or transformation component 238.

The tokenizer 230 is configured to parse the unstructured text data as a sequence of character data symbols (e.g., a string—a sequence of Unicode characters) and to output data indexed by one or more groups of character data symbols. For example, the tokenizer 230 may be configured to partition the unstructured text data into sets of grouped character symbols (e.g., sub-strings) based on one or more punctuation character symbols (such as " "—space—or ",", and "."). These sets of grouped character symbols may correspond to words or word portions. The sets of grouped characters may be referred to as tokens. For example, the unstructured text data "I have a legal problem." may be tokenised to provide a list of grouped characters or tokens: [("I"), ("h", "a", "v", "e"), ("a"), ("l", "e", "g", "a", "l"), ("p", "r", "o", "b", "l", "e", "m")], where each character is represented by its coding integer (e.g., "a" is 97, "I" is 73, "i" is 105 etc.). Different natural language processing and machine learning libraries provide tokenizer functions to implement the tokenizer 230. Tokenizers may be implemented using one or more of pattern-matching, rule-based and neural network approaches.

The token filter 232 removes certain so-called "stop" tokens. These stop tokens may be listed in a data structure and matched to the tokens as output by the tokenizer 230. For example, if the stop tokens comprise [("I"), ("a")] then the matching and removal of the stop tokens to the list above would leave: [("h", "a", "v", "e"), ("l", "e", "g", "a", "l"), ("p", "r", "o", "b", "l", "e", "m")]. Common stop tokens include those that relate to high-frequency words such as: "here", "there", "the", "at", "then", etc. The data structure containing the stop tokens may be obtained from known natural language processing programming libraries and/or configured manually with n frequently occurring grouped character sets (where n may be 100-200). The stop tokens may be selected based on a measure of information content for a classifier. In a preferred embodiment for legal queries, numbers may also be removed by the token filter 232. This may correspond to the removal of both token representing numbers (e.g., ("f", "o", "u", "r")) and number characters (e.g., "4"—which is represented by the decimal integer 52). The token filter 232 thus acts as a character filter to remove character data symbols that match a predefined set of character data symbols. Filtering tokens may help remove tokens that have little informative value and reduce classification noise. The token filter 232 may be implemented using a library function, configured as a bespoke function and/or operate as a sub-function of the tokenizer 230.

The token reduction component 234 may apply one or more of stemming and lemmatization functions. A stemming function acts to map a plurality of tokens to at least single stem token, which may comprise a common prefix or subset of characters. Stemming functions may be provided by natural language processing programming libraries. The Porter stemmer is one well-known stemming function. A stemming function may remove suffixes and/or use a look-up table to map different sets of grouped characters to a common output set of grouped characters. The stemming function generally acts to extract the morphological root of a word. A lemmatization function acts to map a plurality of tokens to at least single grammar unit token. Lemmatization functions are distinguished from stemming functions in that the single grammar unit token may differ from tokens output from the tokenizer, for example ("a", "m") may be replaced with ("b", "e"). Lemmatization functions act to group together the inflected forms of a word so they can be analysed as a single item. Again, a lemmatization function may be selected from a pre-existing library of natural language processing functions. The token reduction component 234 may also use one or more stochastic or neural network functions to map particular tokens to a common output to reduce the number of different possible tokens. Both a stemming function and a lemmatization function may be used as part of a normalization process to reduce the dimensionality of the vector space as used by the vectorization component 236. This can improve classification accuracy.

The vectorization component 236 is configured to convert the tokens (i.e., sets of grouped characters) into numeric values that provide a suitable input for the classifier 218. In certain examples, the vectorization component 236 may use one of a bag-of-words model or token embeddings.

A bag-of-words model may count the frequency of unique sets of grouped characters (i.e., unique tokens). A bag-of-words model may be defined with reference to a corpus of token sets, which in the present case may comprise a database of unstructured text data that forms the training data for the classifier 218. For example, the training data may be processed as part of training to determine a list of unique tokens, which may be stored as a dictionary data structure or list. In this case, each unique token may have a set index or hash, which may correspond to an element location in the numeric vector generated by the vectorization component. In certain cases, these unique tokens may not directly be "words" as commonly understood but may comprise the character groups output of the token reduction component 234 (e.g., see FIGS. 7B and 7C later below). For example, the stemmed token ("h", "a", "v") may have an index of 1055 in a term vector (e.g., corresponding to the $1055^{th}$ element in the vector) and may occur 4 times in the unstructured text data 210, in which case an output of the vectorization component 236 using the bag-of-words model may comprise a value of 4 for the $1055^{th}$ element in the vector. Vector representations that are determined using a bag-of-words model may represent the unstructured text data with a vector (i.e., array or list) of values that has a length equal to a size of a defined vocabulary. The vocabulary may be based on a set of unique tokens as output by the token reduction component 234. In certain cases, the vocabulary may be limited to unique tokens with a frequency above a threshold in the database of training data. An entry in the vocabulary may be set as OOV—out of vocabulary—and used if a particular token does not have a corresponding match in the vocabulary data structure.

Word embeddings comprise arrays of numeric values (typically, one-dimensional arrays of floating-point numbers) that may be generated based on a word embedding matrix. For example, the paper "Efficient Estimation of Word Representations in Vector Space" by Tomas Mikolov et al. (arXiv 2013) and U.S. Pat. No. 9,037,464B1, which are incorporated by reference herein, describe methods of generating word embeddings. Each token is mapped to a word embedding (e.g., by multiplying a one-hot encoding of a token with the word embedding matrix) to convert each token to an array of numeric values (e.g., a 256 or 512 length one-dimensional array). The parameters to generate the word embeddings (such as the word embedding matrix) may be generated by applying a training procedure (e.g., as described in the aforementioned paper) to the training data (i.e., the unstructured text data for a large set of example legal queries).

If the vectorization component 236 implements a bag-of-words model and provides a vector for the unstructured text data based on token frequencies, then in certain cases, it may further process this vector using a perform a term-frequency inverse-document-frequency (TF-IDF) computation. In this case, the count frequencies of the tokens within the numeric vector are normalized based on a corpus of data, which may comprise the database of training data for the classifier 218. The TF-IDF computation normalizes each value within the structured numeric representation to a value between 0 and 1 (e.g., a floating-point number). The closer the value is to one, the more informative the token is deemed to be in the unstructured text data. The closer the value is to zero, the less informative the token is deemed to be in the unstructured text data. The TF-IDF computation for a particular token and a particular received set of unstructured text data ("text") may be implemented as:

$$tf\_idf\_token\_text = tf(token,text) * idf(token,corpus)$$

where:

$$idf(token,corpus) = \log(size\_corpus+1)/(1+df(token))$$

and where tf(token, text) is the frequency (i.e., count) of the token within the text, idf(token, corpus) is the inverse document frequency of the token with respect to a corpus, the corpus comprising a set of texts such as the training data for the classifier 218 (e.g., samples of previously received or obtained unstructured text queries), size_corpus being the number of samples or texts in the set of texts and df(token) being a document frequency, i.e. the number of text samples that contain the token. TF-IDF vectors for the unstructured text data may be computed using suitably configured functions from known natural language processing programming libraries or using bespoke functions.

Whatever approach is applied, the output of the vectorization component 236 is a vector of numeric values that represent the information content of the originally received unstructured text data 210. FIG. 2B also shows an optional vector reduction or transformation component 238 that may be applied as an additional stage following the vectorization component 236 to further reduce the size of the vector prior to the application of the classifier 218. The vector reduction or transformation component 238 may apply one or more of at least three functions: Singular Value Decomposition (SVD—also known as Latent Semantic Analysis or Indexing—LSA/LSI); Principal Component Analysis (PCA); and Mutual Information processing. SVD and PCA are similar approaches that are applied to the set of vectors that exist for the training data. These set of vectors may be combined into a large "document" matrix where each row in the matrix is a vector for a particular sample of unstructured text data representing a legal query. Both SVD and PCA seek to identify dimensions of variation within the document matrix (e.g., as represented by eigenvectors) and represent an original vector as a linear combination of these dimensions of variation. The result is a transform matrix that maps an original vector onto a modified vector. As certain dimensions account for more variation, dimensions that account for less of the variation (e.g., as measured using eigenvalues) may be discarded to provide an approximation that is close to the original vector but has a reduced number of dimensions. The modified vector may thus comprise the top k dimensions of variation from an original set of n dimensions, where k<n. SVD, PCA and/or LSA/LSI may be applied using known implementations that form part of machine learning programming libraries.

In certain cases, the vector reduction or transformation component 238 may further implement a feature selection stage based on a mutual information metric. A mutual information metric may be computed for different combinations of elements (i.e., reduced token forms) within the vector output by the vectorization component 236 using the document matrix as a basis for probability values for the mutual information metric. Mutual information between two random variables is a non-negative value that represents the dependency between the variables. A value of zero represents independence and higher values represent higher dependencies. In this case, values of the mutual information metric may be used to select pairs of vector elements with a high dependency (e.g., a mutual information metric value greater than a defined threshold) for combining or discarding. For example, pairs of elements with high mutual information metric values may be averaged or one of the elements may be discarded to reduce the dimensionality but maintaining a high information content (because the elements are highly linked, one element carries information about the other).

The result of the processing of the text pre-processor 214 is the structured numeric representation 216 that may be classified by the classifier 218 as per FIG. 2A.

FIG. 2C shows a third set of components for the first embodiment. In this variation, a hierarchical classification is performed into two sets or tiers of classes: a first higher level "domain" class and a second lower level "sub-domain" class. An example set of domain classes for a legal application may comprise two or more of: civil_law, commercial_law, contract_law, corporate_law, data_protection_law, employment_law, intellectual_property_law, land_law, tax_law, and family_law. Generally, there may be 5-15 domain classes. Each domain class may then have a particular set of sub-domain classes. The number of sub-domain classes may vary based on the parent domain class. Generally, each domain may have 5-30 sub-domain classes. For example, a set of sub-domain classes for the intellectual_property_law domain may comprise: confidentiality, copyright, design_rights, domain_name_rights, passing_off, patents, and trademarks. From a computer engineering viewpoint, the names of the domain and sub-domain classes are not important and may be replaced with integer indexes (e.g., 0-9 for the domains above representing ten different available domains). Using a hierarchical approach may allow for improved classification accuracy by taking an initial classification problem, such as determining one or 300 different sub-domains, and splitting this into two stages with a reduced number of classes (e.g., a domain class followed by a sub-domain class, where the available sub-domain classes are selected based on a determined domain class). It may also improve training, e.g., making it easier to converge on parameter values that represent a local optimum when using gradient descent approaches.

FIG. 2C shows the components of the examples of FIG. 2A but with the previous classifier 218 replaced by an additional set of components. In FIG. 2C, the legal classification system 200 comprises a first domain classifier 240 that outputs domain classification data 242. The classification data 242 is received by a sub-domain classifier controller 244 that then configures a sub-domain classifier 246 that is associated with a domain class indicated in the domain classification data 242. The sub-domain classifier 246 also receives the structured numeric representation 216 and outputs sub-domain classification data 248. The domain classification data 242 and the sub-domain classification data 248 are then combined to provide the output classification data 220.

In one case, the domain and sub-domain classifiers 240 and 246 are of a common type and each receive the structured numeric representation 216 of the unstructured text data. In this case, the sub-domain classifier controller 244 may have access to trained parameters for each domain class, representing the parameters for the sub-domain classifier for that domain. The sub-domain classifier controller 244 may determine a classified domain from the domain classification data 242 (e.g., based on a highest entry within a classification vector) and then load the parameters for the appropriate sub-domain machine learning classifier.

In particular, in one example, the domain classifier 240 may return one classification that is deemed the most probable of all possible domain classifications (e.g., based on a largest probability or logit value in an array where the elements are associated with a plurality of available classes). The return of the one classification may trigger the sub-domain classifier 246 to use the same classification input data (e.g., unstructured text data and/or ancillary data as described later below) and to make a classification of the most probable sub-domain within a set of all possible sub-domain classifications, given the assigned domain. In certain variations, the sub-domain classifier 246 may be adapted to receive the output classification vector from the domain classifier 240 as an additional input, as this may be informative for sub-domain classifications within the set of sub-domains for a selected (e.g., most probable) domain classification. In certain variations, to speed up processing, the domain and sub-domain classifiers 240 and 246 may be applied in parallel to the same input data, and then the output of a particular sub-domain classifier from a set of sub-domain classifier for all domains may be selected based on the domain classification.

It should be noted that in the examples above, certain components may be distributed across multiple computing devices. For example, one or more of the text interface 212, the text pre-processor 214 and a classifier (e.g., 218, 240 and/or 246) may be located on a client computing device such as 110 in FIG. 1. In these cases, the structured numeric representation 216 may be transmitted over the network instead of the unstructured text data 210. In another case, the domain classifier 240 and the sub-domain classifier 246 may be implemented on different server computing devices. Other variations are also possible.

Test Results with the First Example Embodiment

Different combinations of components as described with reference to FIGS. 2A to 2C were implemented with a set of training data with unstructured text data representing a legal query and a manually applied domain and/or sub-domain label. A configuration with a token filter 232, a token reduction component 234 that applied a stemming function, a vectorization component 236 that determined frequency vectors, no vector reduction or transformation component 238, and a support vector machine classifier (linear and trained with stochastic gradient descent) was found to have the best all-round performance across accuracy, precision, recall and F1 metrics (77%, 72%, 69% and 70% respectively). This represents a preferred configuration. Increasing the dimensionality of the structured numeric representation 216 increased the performance of the linear support vector machine classifier but reduced performance of radial basis function and polynomial support vector machine classifiers (the latter classifiers being found to perform relatively poorly). A configuration using a token filter 232, a token reduction component 234 that applied a lemmatization function, and a vectorization component 236 that determined TF-IDF vectors was found to lead to relatively poor recall and F1 metrics (e.g., of 59% for the linear support vector machine classifier and 31% for the Naïve Bayes classifier). The vector reduction or transformation component 238 was found to reduce accuracy for a linear support vector machine classifier (from 75-77% to 67-72%), hence better performance was found omitting this component when resources were not limited. Many classifiers, such as Random Forests and Naïve Bayes classifiers had suitable accuracy or precision metric values (e.g., from 70-84%) but performed badly on the recall and F1 metrics (e.g., values between 48 to 57%).

Second Example Embodiment

Based on the test results described above, a second example embodiment was proposed that is shown and described with reference to FIGS. 3A and 3B, with variants shown in FIGS. 4A to 4D and 5. The second example embodiment was developed by machine learning engineers faced with the accuracies output by the first example embodiment, with an aim to develop a machine learning processing pipeline for unstructured text data that may be incorporated into a production application. The same set of training data was used to evaluate the second example embodiment in tests.

The example of FIG. 3A is based on the example of FIGS. 2A to 2C. Where differences are not explicitly described it may be assumed that the components and variations described with reference to FIGS. 2A to 2C equally apply to the examples of FIGS. 3A and 3B. Like the legal classification system 200 of FIG. 2A, the legal classification system 300 of FIG. 3A comprises a text interface 312 that receives unstructured text data 310. The text interface 312 then passes the unstructured text data to a text pre-processor 314 than converts the unstructured text data to a structured numeric representation 316. The text pre-processor 314 may be configured as shown in one or more of FIGS. 2A and 2B. In FIG. 3A, at least one machine learning classifier 318 receives the structured numeric representation 316 and maps this to a set of classification data 320. As described elsewhere, in certain cases, the unstructured text data 310 may comprise the output of a speech-to-text and/or translation system, or these components may be incorporated into the text pre-processor 314, with a precursor to the unstructured text data 310 being received in place of the shown unstructured text data 310. Furthermore, the legal classification system 300 of both FIGS. 3A and 3B may be implemented on a single client or server computing device, or across a distributed computing system comprising multiple devices.

In addition to the first example embodiment, the legal classification system 300 of the second example embodiment also receives session data 330 relating to the legal query that is embodied in the unstructured text data 310. For example, the session data 330 may comprise initial query parameters and/or properties of the user making the legal query. In one case, the session data 330 indicates one or more of: a user account type; a legal query role; a legal query status; and a desired legal query outcome. In certain cases, one or more of the legal query role, legal query status, and the desired legal query outcome may be determined from data indicating a user role, user status and desired user outcome. This may be the case if there is a one-to-one mapping between users and legal queries. If, on the other hand, a user has multiple legal queries to classify, then different role, status and outcome selections may be provided for each legal query. In one case, the session data 330 comprises selections by the user of a sequence of field values from a respective sequence of defined field value sets. For example, values for each of the four data types discussed previously may be selected from a list of available values that are displayed sequentially on a client computing device such as 110 in FIG. 1. Example available values for one test implementation are shown in FIG. 7F.

At least a portion of the session data 330 may be collected when a user registers as a user of the legal classification system 300 and/or prior to the entry of the unstructured text data 310. The session interface 332 receives the session data 330 and forwards it on to a classifier optimizer 334. The classifier optimizer 334 comprises a component to process the session data 330 and to generate configuration data 336 for the at least one machine learning classifier 318. The configuration data 336 controls the operation of the at least one machine learning classifier 318. In one case, the configuration data indicates a subset of the defined set of classes that are valid given the session data 330. For example, this may set the dimensionality of a classification vector output by the at least one machine learning classifier 318 and/or hard-set certain elements of the vector or weights of the classifier to be zero. In one case, the session data 330 may be converted to a numeric form (e.g., at least integer values and/or concatenated one-hot vectors representing the selections) and used as part of the numeric input for the classifier 318. It has been found that having this additional information greatly improves the accuracy of the classifier 318—moving from accuracies of around 70% to above 90%.

In one case, the classifier optimizer 334 may apply a manually defined mapping between the values of the session data 330 (e.g., a set of selections from a defined number of options) and available classes. This mapping may be applied based on received session data 330 to indicate the available classes to be used for the classification by the classifier 318. In another case, this mapping may be learnt during training, e.g., by storing session data 330 with the unstructured text data 310 and a validated or manually selected class label and by using this as part of the classifier input.

FIG. 3B shows a variation of the example of FIG. 3A. In this case, a hierarchical classification is applied in a similar manner to FIG. 2C. The classifier 318 of FIG. 3A is replaced with a domain classifier 340, a sub-domain classifier controller 344 and a sub-domain classifier 346. As explained with respect to FIG. 2C, the domain classifier 340 performs a domain classification upon the structured numeric representation 316 and outputs domain classification data 342. The domain classification data 342 is passed to the sub-domain classifier controller 344, which then configures the sub-domain classifier 346 based on the determined domain class, e.g., by loading a suitable set of trained parameters and/or a suitable sub-domain classifier component. The sub-domain classifier 346 is then configured to map the structured numeric representation 316 to one of the sub-domains for the classified domain and output the sub-domain classification data 348. The domain and sub-domain classification data 342 and 348 are then output as classification data 320.

In FIG. 3B, the configuration data 336 output by the classifier optimizer 334 is used to select one or more valid sets of domain and/or sub-domain classes. For example, based on the session data 330, the classifier optimizer 334 may output a subset of domain classes and/or sub-domain classes (e.g., associated with the subset of domain classes) that represent possible outputs for the domain classifier 340 and the sub-domain classifier 346.

In one implementation, a set of possible domain and sub-domain combinations may be predefined (e.g., by taking each combination of parent and child class). These need not be exhaustive, and further classes may be added via future training and/or cascaded classifiers as discussed later with respect to the validation loops. The set of possible domain and sub-domain combinations may be linked to a particular text scenario as also described later below (e.g., with respect to FIG. 4D) and/or may be used without text scenarios. In any case, a correlation matrix between different combinations of session data (e.g., different combinations of list selections from a predefined sequence of defined value lists) and different combinations of possible domain and sub-domain classes may be defined based on saved training data samples, e.g., as stored in a database of training data. This correlation matrix may be used as configuration data 336. In one case, it may be flattened or otherwise provided as input to the machine learning classifier in additional to the structured numeric information. In another case, it may be used to post-process the output of one or more of the classifiers 340, 346. For example, class probabilities output by the machine learning classifiers may be weighted based on relevant values in the correlation matrix, these values being determined by matching the current session data 330 to one of the rows or columns of the correlation matrix representing a particular session data combination. For the domain classifier 340, entries in the other of the rows or columns of the correlation matrix representing different domain and sub-domain combinations may be aggregated (and in certain cases normalised) across the available domains and then the resulting correlation values used to weight the output domain class probability vector. In this case, statistical measures relating to the associations between the session data 330 and validated classifications as computed from the database of training data may be used to modify the output of the machine learning pipeline that comprises trained classifiers 340 and 346.

As an example in a legal application, a particular combination of values within the session data 330 may be determined. This, for example, may be a particular combination identified by a user account type value plus one or more of a legal_query_role value, a legal_query_status value and a legal_query_outcome value. If there are two user account types and 10 available values for each field, this allows for 2000 combinations. Based on historical data in the database of training data, a correlation matrix may be computed or obtained (e.g., from a previous batch computation) that relates the session data combinations to a set of domain classes. If there are 10 domain classes, say, the matrix may be 2000 by 10. In the present example, the domain classifier 340 may output domain classification data 342 in the form of a probability vector. The correlation matrix may then be used to weight the probability vector output. For example, assume the elements associated with the domain classes "family_law", "commercial_law", and "contract_law" in the probability vector have the three highest values representing the three most probable classifications. In this case, the row of the correlation matrix is selected representing the particular session data combination (e.g., one out of 2000) and the values in this row associated with the "family_law", "commercial_law", and "contract_law" columns are retrieved. If the value for "commercial_law" is 0 or is close to 0, then this class is effective discounted following the weighting, leaving "family_law" and "contract_law" as the available domain classes that are determined to be probable. In implementations, this computation may be configured as a series of functions and/or one or more linear algebra operations (e.g., the element-wise multiplication of a row in the correlation matrix relating to the session data combination and the probability vector to output a weighted probability vector).

A similar computation may be applied to the sub-domain classes. For example, sub-domain classifications may be performed for the top k entries in a weighted probability vector. In the above example, if k=2, then the top 2 domains are "family_law" and "contract_law" and sub-domain classifications are performed by the sub-domain classifier 346 for both these domain classes. The sub-domain classification data 348 thus initially comprises probability vectors for the sub-domains associated with each of the top k domains. Entries in the above correlation matrix relating to the particular domain and sub-domain combinations are then retrieved and used to weight the sub-domain probabilities for each domain. For example, as before, a row in the correlation matrix associated with the particular session data combination is selected and columns representing the applicable domain and sub-domain combinations are retrieved to weight the sub-domain probability values.

In the above example, the processed sub-domain classifications, e.g., in the form of weighted probability vectors for the sub-domains for the top k domains, may then be further processed to select a final output domain and sub-domain classification that is returned as classification data 320. For example, there may be 30 possible child sub-domains across the domains of "family_law" and "contract_law". In the correlation matrix, these may correspond to 30 possible domain-sub-domain combinations as represented by columns in the matrix. Particular values for these 30 possible domain-sub-domain combinations may be selected by taking the row of the correlation matrix that corresponds to the particular current session data combination. These may be used to weight the sub-domain classifications for the two domains, and the largest weighted output may be used as the chosen sub-domain classification, with the domain classification being selected as the parent of the chosen sub-domain classification. For example, in the above case of "family_law" and "contract_law" domain selections, there may be 7 non-zero entries (or entries above a predefined threshold) in the correlation matrix for the particular row-column selections. If the entries related to the "family_law" sub-domains have higher values, then the resultant weighted probability values may have a highest value relating to a "family_law" sub-domain class (e.g., "divorce"), so that is selected as the output sub-domain class and "family_law" is selected as the output domain class.

Those skilled in the art will understand that the above examples may be varied whilst having the same effect of modifying the machine learning classifier outputs based on the received session data 330, where the modifying may be based on the database of training data that stores combinations of past session data and validated classifications. For example, a discrete version of the above approach may be applied using integer counts of session data and classification combinations. In one case, a simple count of non-zero or above-threshold entries in the correlation matrix may be made (e.g., sub-domains for "family_law" may be associated with 4 past samples that match the session data combination but sub-domains for "contract_law" may only be associated with 3 past samples that match the session data combination, so "family_law" may be selected as the domain and the highest probability sub-domain for that domain may be selected).

The example of FIG. 3B also shows how the session data 330 may be obtained in one or more iterative loops, where initial selections within the session data 330 may be used to order or select subsequent selections. Features of this approach are also described later with reference to FIG. 5. FIG. 3B shows a frequency ranking component 350 that is communicatively coupled to a database of training data 352 for the legal classification system 300. For use in training the classifiers 340 and 346, the database of training data 352 stores the session data 330, at least one of the unstructured text data 310 and the structured numeric representation 316, and the classification data 320. By processing the unstructured text data 310, correlations between the sequence of selections may be determined. For example, a selection of a first value from a first list of options may rule out selection of a second value from a second list. In the example of FIG. 3B, the frequency ranking component 350 is configured to order the selectable options in a series of listed options based on the frequency of prior selection, e.g. following selection of the first value from the first list, a positively correlated value in the second list may have a high rank or order and a negatively correlated value in the second list may have low rank or order, where the relative rank or order is determined based on the strength of the historical correlations. This frequency ranking may improve classification by reducing user selection error (e.g., as impossible or infrequent selections may be ranked low in a list such that they are unlikely to be accidently selected by a user).

The correlations between session data combinations described above may further be broken down into sequences of correlations between different session data fields so as to combine the two approaches. For example, a particular combination of session data may be represented as a set of correlations between different list selections. These correlations may then be used to rank possible values for each list selection such that the user may more easily select the most likely selection based on historical data. This prevents the initial entry and selection of session data from becoming a rigorous hurdle for the user to overcome.

In certain cases, the classifier optimization may be performed initially but may be reduced and/or omitted as classifier accuracy improves during training. Hence, a hybrid semi-supervised learning system is provided.

Validation Loops

FIGS. 4A to 4D show an example of a validation loop 400 that may be used with any of the previously described examples. In FIGS. 4A to 4D certain components are omitted for clarity and for ease of explanation, the validation loop 400 will be described with reference to the second embodiment of FIGS. 3A and 3B. In the examples of FIGS. 4A to 4D, multiple classifiers of different types are used to provide classification (e.g., in a cascaded manner). A first machine learning classifier of a first type is applied to perform one or more of domain and sub-domain classification and, if the output of the first machine learning classifier of the first type is invalidated, a second machine learning classifier of a second type is used. This process may continue a predefined number of times until a manual classification is presented. This approach allows for a continuous process that results in an accurate classification, and also collects training data that may be used to train the classifiers. Although reference is made in the examples below to a manual validation by a user, in other implementations, an automated validation by a further machine learning classifier may be used (e.g., using a discriminator as used by adversarial neural networks such as generative adversarial networks (GANs)).

Figure 4A:
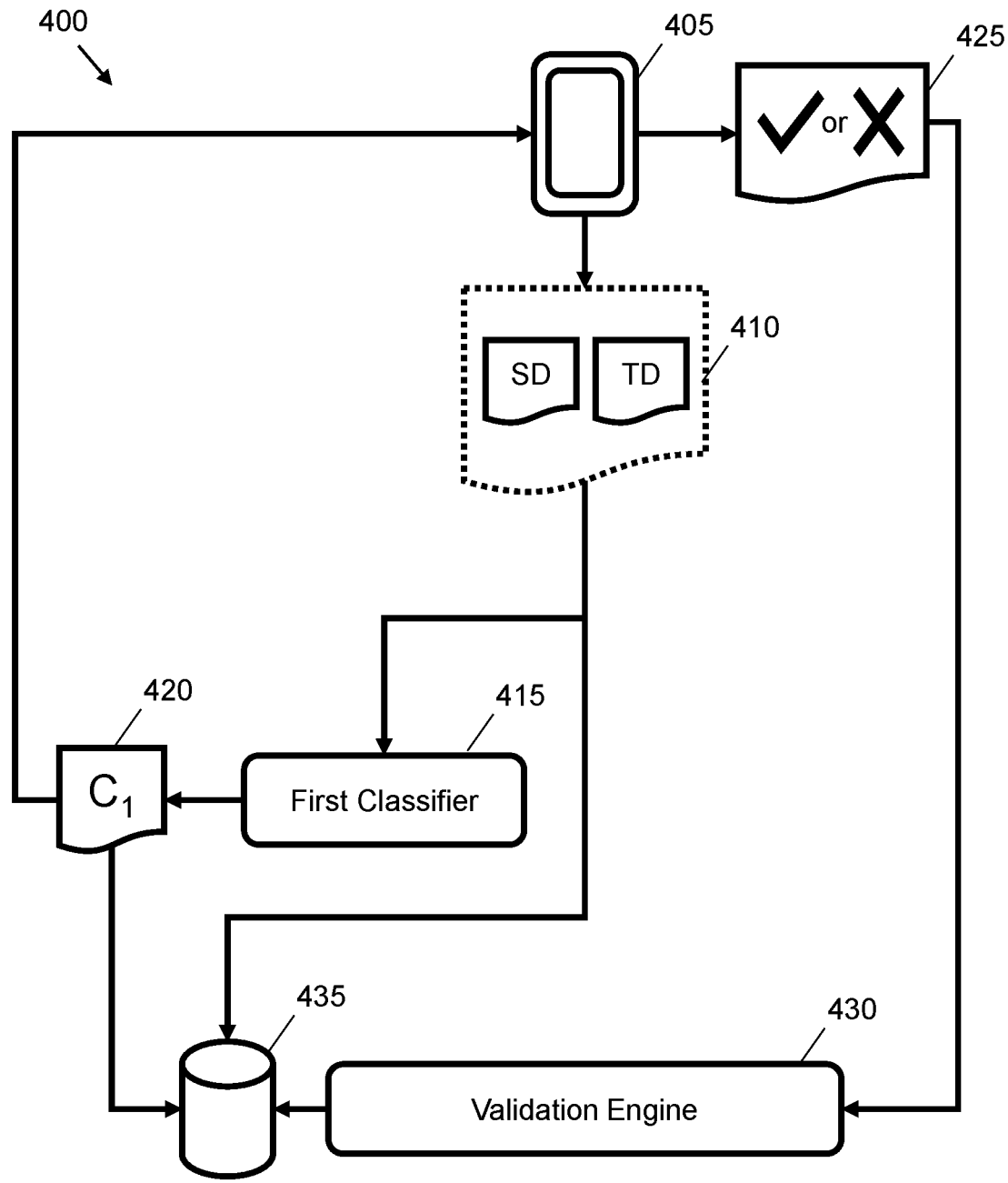
FIGS. 4A to 4D are schematic diagrams showing a validation process performed by an example validation engine.

In FIG. 4A, a client computing device 405, which may be one of the client computing devices 110 shown in FIG. 1, sends session data and unstructured text data as data 410 to a legal classification system that comprises multiple machine learning classifiers. FIG. 4A shows a first classifier 415 that is applied to the received data 410 to output classification data 420 for a first classification. The classification may occur in the manner described with reference to the examples above. In one case, the first classifier 415 may comprise a domain classifier and a sub-domain classifier as per FIG. 2C or FIG. 3B, wherein the classification data 420 indicates a domain class and a sub-domain class.

In FIG. 4A, the classification data 420 for a first classification is returned to the client computing device 405 (e.g., in a similar manner to classification data 142 in FIG. 1). A user of the client computing device 405 then acts to validate the classification data 420. Validation may comprise indicating whether the classification appears correct to the user. Validation may be performed for both a domain class and a sub-domain class. In FIG. 4A, the client computing device 405 returns validation data 425 to a validation engine 430. The validation engine 430 controls the validation of the output of the first classifier 415. The validation engine 440 may form an additional component of the legal classification systems 200 and 300 in FIGS. 2A to 2C and 3A to 3B. The validation data 425 may comprise at least a binary indication as to whether each classification is correct (e.g., 0 indicates an invalid classification and 1 indicates a valid classification). The validation engine 430 receives the validation data 425 and stores this together with the data 410 received from the client computing device 405 and the classification data 420 in a database of training data 435.

The validation engine 430 selectively configures the legal classification system based on the validation data 425. If the validation data 425 indicates a valid classification (of one or more of a provided domain and sub-domain class), then the validation completes with the storage of the data in the database of training data 435. If the validation data 425 indicates at least one invalid classification, then a validation loop continues with FIG. 4B.

Figure 4B:
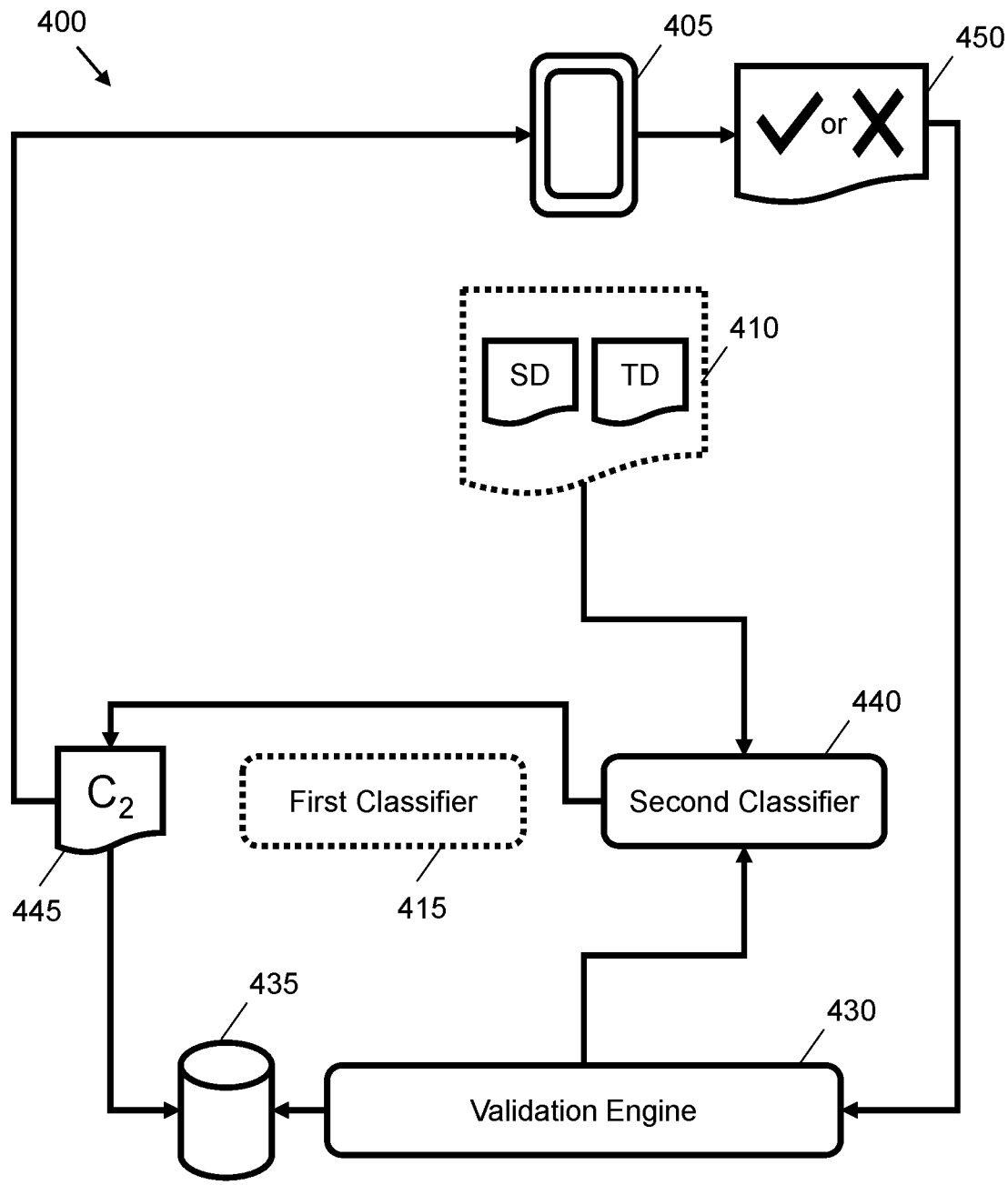

FIG. 4B shows the action of the validation engine 430 if the validation data 425 indicates at least one invalid classification. In this case, a further classification is performed with a second classifier 440. The second classifier 440 and the first classifier 415 may be of different types, e.g., use different machine learning models. For example, the first classifier 415 may comprise a logistic regression classifier and the second classifier 440 may comprise a linear support vector machine classifier. The second classifier 440 receives the same input as the first classifier 415, i.e., a structured numeric representation derived from data 410 as described with reference to the previous examples of FIGS. 2A to 2C and 3A to 3B. The second classifier 440 provides classification data 445 for a second classification. In one case, the same configuration data as shown as 336 in FIGS. 3A and 3B may be received by both the first and second classifiers. As for the first classifier 415, in certain variations the second classifier 440 may comprise a domain classifier and a sub-domain classifier (e.g., as per FIG. 2C or 3B) such that the classification data 445 output by the second classifier comprises an indication of a domain class and an indication of a sub-domain class. In a case where a domain class is validated but a sub-domain class is not validated, the second classifier 440 may only provide a classification for the sub-domain class.

In one variation, if a point is reached where a second domain classification is needed, because of invalidation, the second classifier may be selected as a different type. In certain cases, the first classifier may comprise a logistic regression classifier and the second classifier may comprise a support vector machine classifier. The second classifier may be configured to return the top k most probable domain classifications and discount the invalidated domain classification from the first classifier if it ranks within those k (e.g., where k=3). Priority selection of a domain class from the second classifier may be given to the classification that is most probable of those n, following deduction of any invalidated classification. The staggered activation of classifiers in this manner may also save computing resources as the second classifier may only be applied if the first classification is invalidated. Similar approaches may be applied to both domain and sub-domain classifiers.

In a similar manner to the process described with reference to FIG. 4A, the classification data 445 for the second classification is returned to the client computing device 405 for further validation. The user of the client computing device 405 may thus validate the second classification, returning validation data 450 to the validation engine 430. The validation engine 430 then adds the additional validation data 450 to the training data sample for the present iteration. In other examples, validation may be performed internally without user input based on the output of a trained discriminator neural network.

If the validation data 450 in FIG. 4B indicates a successful validation of the second classification (e.g., correct domain and/or sub-domain class) then the validation loop stops. If the validation data 450 indicates that the classification data 445 is still invalid, then the validation loop may proceed to FIG. 4C.

Figure 4C:
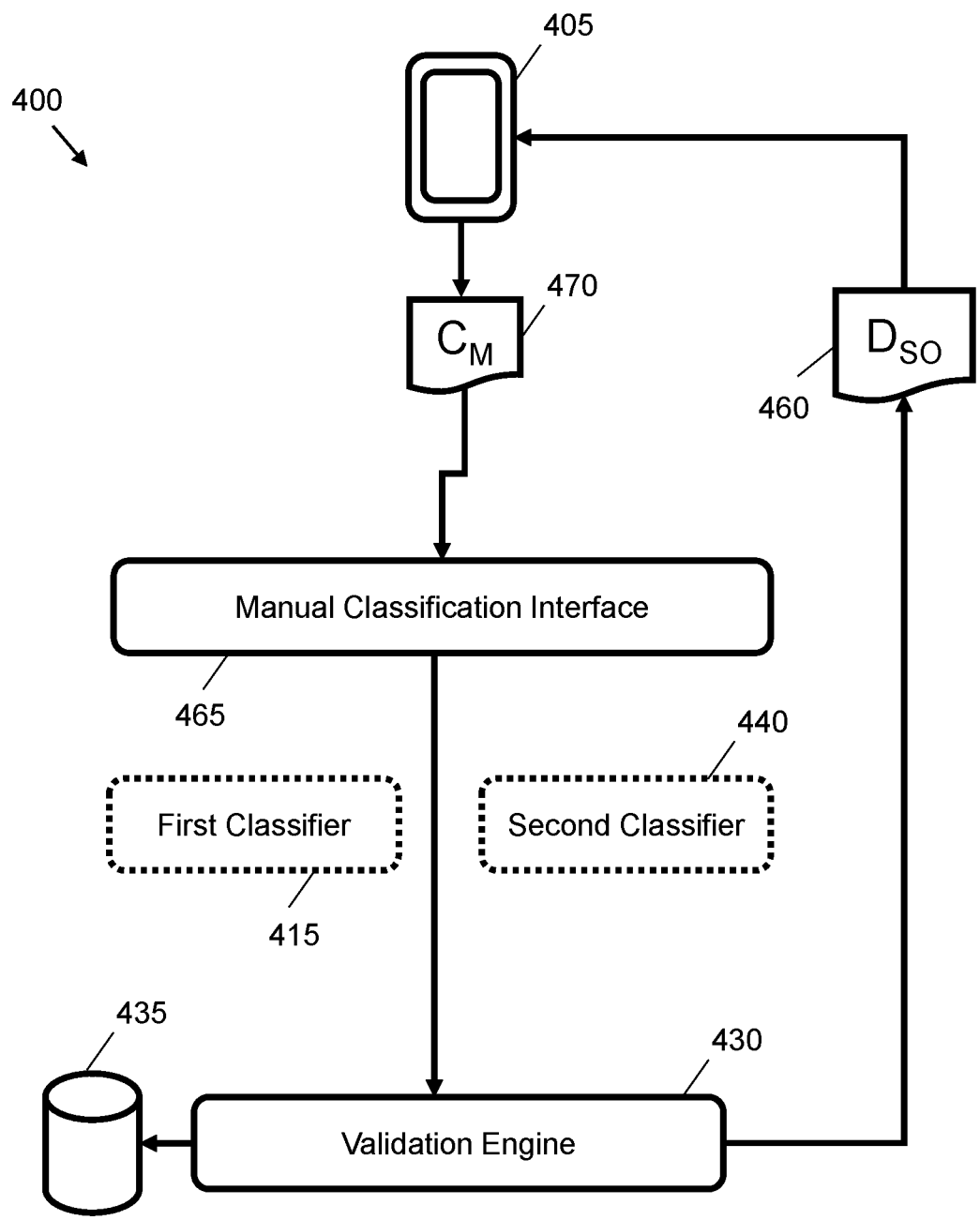

In FIG. 4C, the validation engine 430 provides selection data 460 indicating at least a subset of the available classification classes for manual selection. For example, the validation engine 430 may provide a list of available classes that have not been invalidated. In a hierarchical classification case, one or more available classes for a domain and sub-domain may be provided, where a subset of sub-domains may be selected at the client computing device 405 based on an initial manual domain class selection. Classification data 470 indicating the manual classification of one or more classes (e.g., one or more of a manually selected domain and sub-domain class) is then sent from the client computing device 405 and received by a manual classification interface 465, which may form part of the legal classification system. In certain cases, the manual classification interface 465 may form part of the validation engine 430. The manual classification interface 465 receives the classification data 470 indicating a manual selection of classes from the selection data 460. Then at least one of the manual classification interface 465 and the validation engine 430 is configured to store the manually selected classification data 470 in the database of training data together with the initial data stored in FIGS. 4A and 4B (i.e. data 410, 420, 425 and 445). The validation loop then finishes.

It has been found that over a large body of test data that accuracy of between 94% and 96% may be obtained by applying a cascade of two classifiers of different types as shown in FIGS. 4A and 4B. The validation loop of FIGS. 4A to 4D allows a form of semi-supervised classification. For example, this accuracy was obtained with a logistic regression classifier as the first classifier 415 and a linear support vector machine as the second classifier 440, with a configuration similar to that shown in FIG. 3B. This means that the manual classification interface 465 is only required for a small proportion of cases—between 4-6% of legal queries. This is a suitable accuracy for a high-volume automated network-accessible legal classification system. Additionally, the small proportion of cases that require manual classification result in additional training data for the database of training data, thus helping to further reduce accuracy when further training of the classifiers is performed. Although in tests only two classifiers were found necessary for high accuracy in certain examples a cascade of more than two classifiers may be used. Validation in this manner also provides examples of both positively and negatively validated classifications. This may allow more forms of machine learning classifier to be used.

Figure 4D:
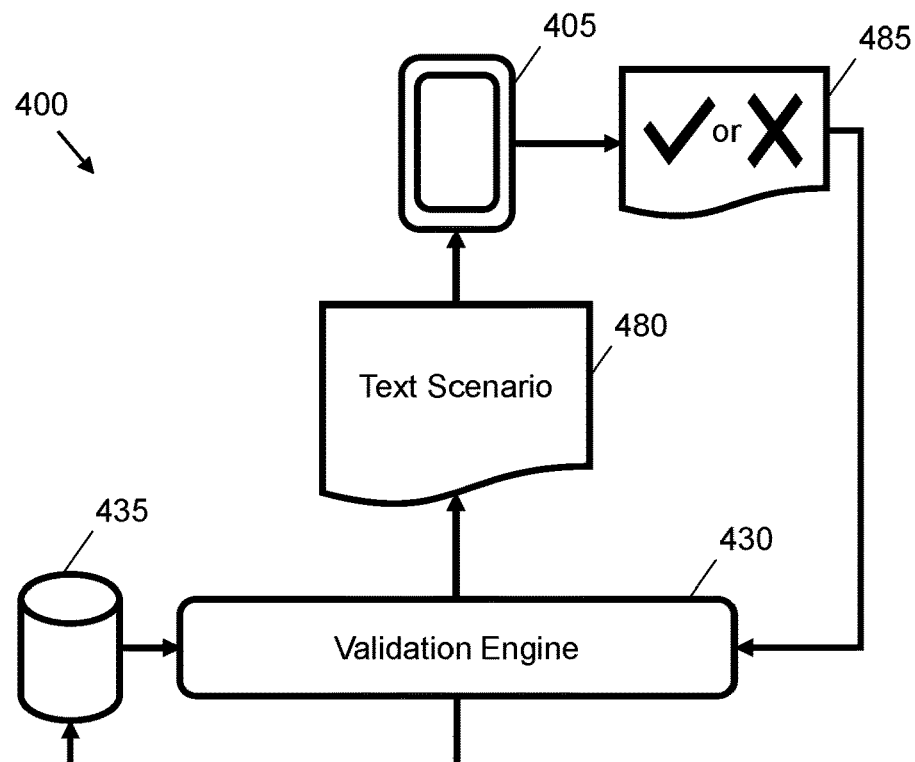

FIG. 4D shows an optional final step that may be performed once a validated set of one or more classes has been received. In this case, the validation engine generates a text scenario for transmission to the client computing device 405. The text scenario 480 may comprise a set of unstructured text data that describes a scenario that is consistent with the validated classes. For example, a text scenario may be generated based on a validated domain and sub-domain and samples in the database of training data 435 that have the same validated domain and sub-domain. The text scenario may be generated by a generative machine learning model. In other cases, the text scenario may be selected from a database of text scenarios that is indexed by validated class. In both cases, a user of the client computing device 405 acts to validate the text scenario as relating to their initial legal query, in a similar manner to the previously described class validation. The client computing device 405 then returns validation data 485 for the text scenario to the validation engine 430. The validation engine 430 stores the text scenario 480 and the validation data 485 in the database of training data 435. The text scenario 480 and the validation data 485 may be stored together with the previous data, e.g., two or more of 410, 420, 425, 445, 450 and 470. The text scenario 480 may form part of the training data for the classifiers and/or used to obtain the session data 430.

In certain examples described herein the system is adapted to identify relevant and non-relevant classifications, for example using session data and a classification optimizer. This is also enabled as a result of the cascade of classifications with respect to classifying classes and sub-classes. These features in combination enables the system to essentially work back-to-front by identifying the probability of a scenario, that then links to a sub-class and the sub-class links to a parent or domain class. The "validation loop" described in this section then contributes to this by providing a 'second chance' at getting the right classification; for instance, in test implementations of cascaded models, the vast majority (e.g., above 95% up to 99%) of classifications are correct within two attempts. This then provides a technical system that is suitable for implementation as a real-world service.

Data Input Optimizer

Figure 5:
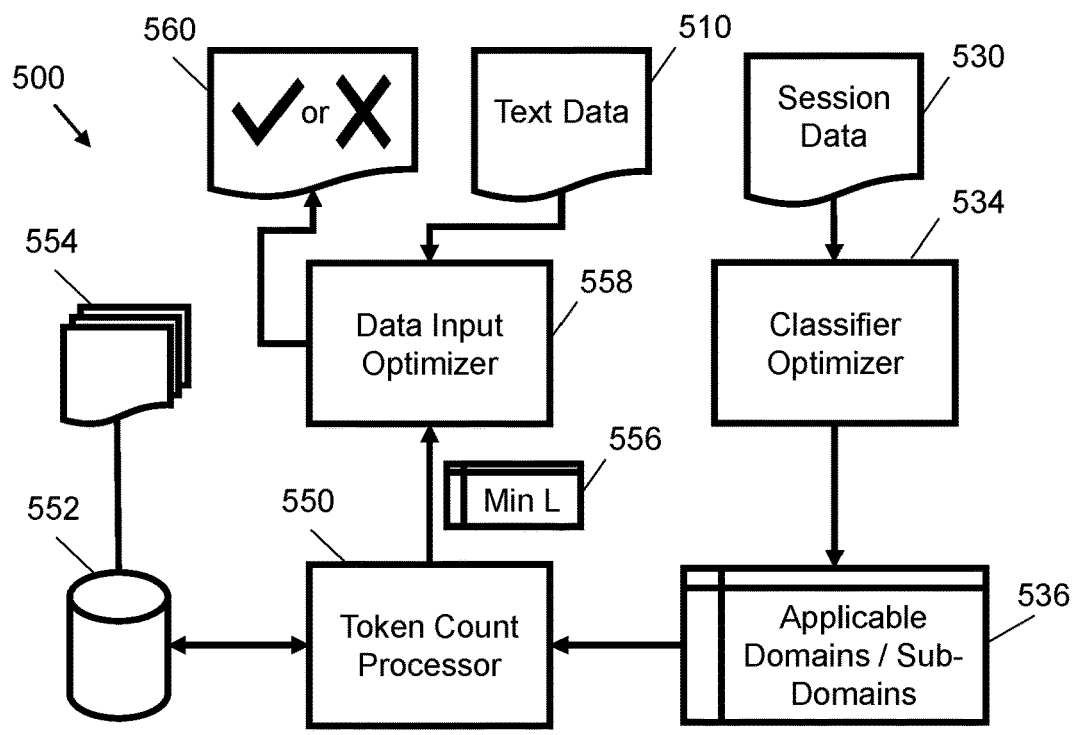
FIG. 5 is a schematic diagram showing a data input optimizer, a classifier optimizer, and a token count processor.

FIG. 5 shows a variation 500 of the second example embodiment. In this case, the legal classification system 300 of FIG. 3A or 3B is adapted to optimize the form of the received unstructured text data 510 to improve classification accuracy. For clarity, certain components of FIGS. 3A and 3B are omitted for clarity (e.g., the receiving interfaces and the classifiers) but they may be assumed to be present unless otherwise indicated.

The variation 500 of FIG. 5 receives unstructured text data 510 and session data 530 as per the examples of FIGS. 3A and 3B. The session data 530 is obtained by a classifier optimizer 534 that outputs configuration data 536 in the form of a set of applicable domains and/or sub-domains. The functionality of the classifier optimizer 534 and the configuration data 536 is the same as the classifier optimizer 334 and the configuration data 336 in FIGS. 3A and 3B. In FIG. 5 an additional token count processor 550 is provided. The token count processor 550 is configured to receive the configuration data 336 determined by the classifier optimizer 534. The token count processor 550 is communicatively coupled to a database 552 of training data 554, where the training data comprises samples of unstructured text data, such as is stored during the operation of the validation loops described with respect to FIGS. 4A to 4D above. The token count processor 550 uses the configuration data 536 together with the training data 554 stored in the database 552 to determine a minimum token count 556. The minimum token count 556 is passed to a data input optimizer 558 that monitors the gathering of the unstructured text data 510. The data input optimizer 558 may be located locally on a client computing device or may form part of a server computing device that receives partial data during an interactive session. The data input optimizer 558 is configured to apply at least a tokenizer to the unstructured text data 510 to determine a number of tokens that are present at a particular time. The data input optimizer 558 compares the number of tokens within the received unstructured text data 510 with the minimum token count 556 received from the token count processor 550 and outputs validation data 560 indicating whether the number of tokens meets the minimum token count 556. The validation data 560 may be processed by a client or server computing device whereby progression with the legal query is not possible until the unstructured text data 510 is suitably validated. Once the number of tokens within the received unstructured text data 510 meets and/or exceeds the minimum token count 556 then at least the data input optimizer 558 may signal that classification is to take place and the classifiers (e.g., 318, 340 or 346) may be initiated as part of the previously described classification process (e.g., the loops shown in FIGS. 4A to 4D may begin).

In tests it has been found that setting a minimum token count, which may be a minimum word count if the tokens correspond to words, greatly improves classification accuracy by ensuring that enough information is collected to provide an accurate classification. Although reference in this example is made to a minimum token count, this count may be provided, in other examples, in the form of a minimum character count, e.g., a tokenizer need not be applied and the tokens are considered to be characters as present in the unstructured text data.

In one implementation, the token count processor 550 is configured to obtain an applicable set of domains and sub-domains using the configuration data 536. One or more statistical measures are then retrieved for the applicable set of domains and sub-domains. The one or more statistical measures may be determined online or offline. In the latter case, they may be periodically computed (e.g., as part of scheduled daily operation) for rapid retrieval. In one case, a median number of tokens for the unstructured text data stored in the database 552 is determined per sub-domain (e.g., based on all the unstructured text data that is validated as belonging to a given sub-domain as part of the validation loops of FIGS. 4A to 4D). The arithmetic mean of these median values is then determined for the applicable sub-domains for each applicable domain (e.g., as indicated in the configuration data 536). For example, if there are applicable domains [a, b, d] from the total set of domains [a, b, c, d, e] and each of the applicable domains have respective applicable sub-domains: a—[i, iii, iv] out of [i, ii, iii, iv, v], b—[2, 3] out of [1, 2, 3, 4, 5] and d—[x, z] out of [v, w, x, y, z] then the token count processor 550 retrieves the median token counts for each of domains i, iii, iv, 2, 3, x and z computes the arithmetic mean for each of the applicable domains: av_a=(med_i+med_iii+med_iv)/3, av_b=(med_2+med_3)/2, av_a=(med_x+med_z)/2, and then selects the mode of the determined arithmetic means: min L=mode(av_a, av_b, av_c). Although this method has been described and has been found to improve accuracy in practice, other similar approaches may be used (e.g., different statistical measures may be used to provide a similar output token count, for example, a mean of all applicable sub-domains may be taken).

Setting a minimum token count has been found to reduce data noise and increase the ability of classifiers to be trained to extract and classify suitable data features. For example, as users may enter the unstructured text data in a free text box, the legal query may be expressed in any number or combination of characters and words. This freedom, together with the large number of possible domain and sub-domain combinations, makes it difficult to ensure classifier accuracy. A data input optimizer 558, when combined with the classifier optimizer 534 and the validation loops of FIGS. 4A to 4D, has been found to lift classification metrics from unusable levels (e.g., around 70%) to usable levels (e.g., around 95%). Also, it has been found that classification accuracies tend to vary by domain and sub-domain. The data input optimizer 558 and use of a minimum token count 556 means that more data is gathered for difficult to classify classes and less data is needed for easy to classify classes.

Although the example of FIG. 5 has been described with reference to the applicable domains and sub-domains that are determined by the classifier optimizer 534, it is also possible to implement the token count processor 550 and the data input optimizer 558 without the use of the classifier optimizer 534 and/or without the use of hierarchical classification. For example, the approach described above may be performed for all available classes based on the training data 554, without any filtering being performed by the classifier optimizer 534, and may be performed for only one classifier and one set of available classes.

In one example, the data input optimizer 558, the token count processor 550 and the frequency ranking component 350 may be combined into a single component, wherein the database 352 in FIG. 3B is the same as the database 552 in FIG. 5 (and may be the same as the database 435 of the examples of FIGS. 4A to 4D). In this case, the combined component may be referred to as a data input optimizer, and this data input optimizer may be configured to order values within defined field value sets (e.g., as are sent as selection option data 354) based on the database 552 of training data 554.

Example Methods of Classifying Unstructured Text Data

Figure 6A:
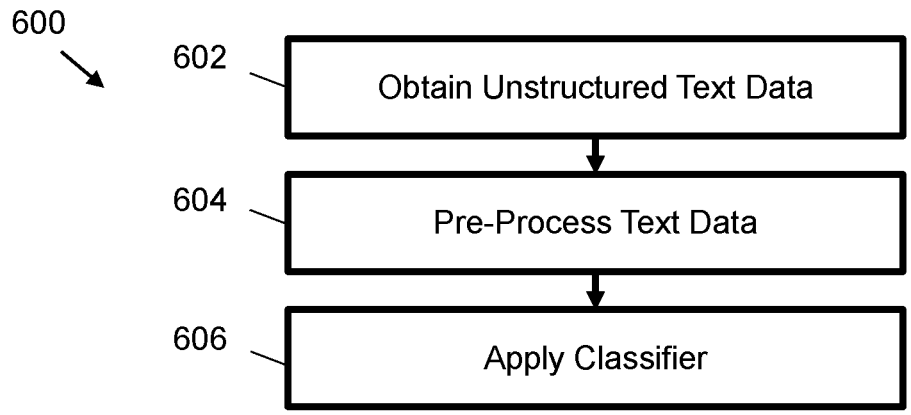
FIGS. 6A to 6C are flow diagrams showing example methods of classifying unstructured text data.
Figure 6B:
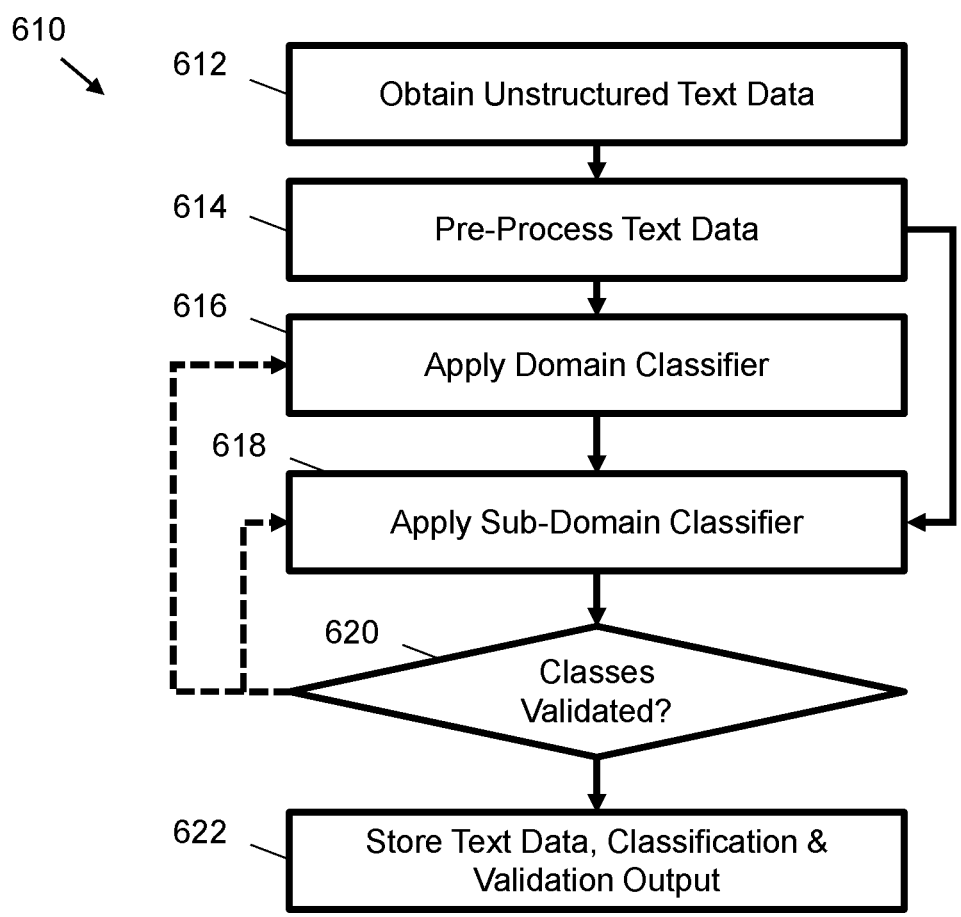
Figure 6C:
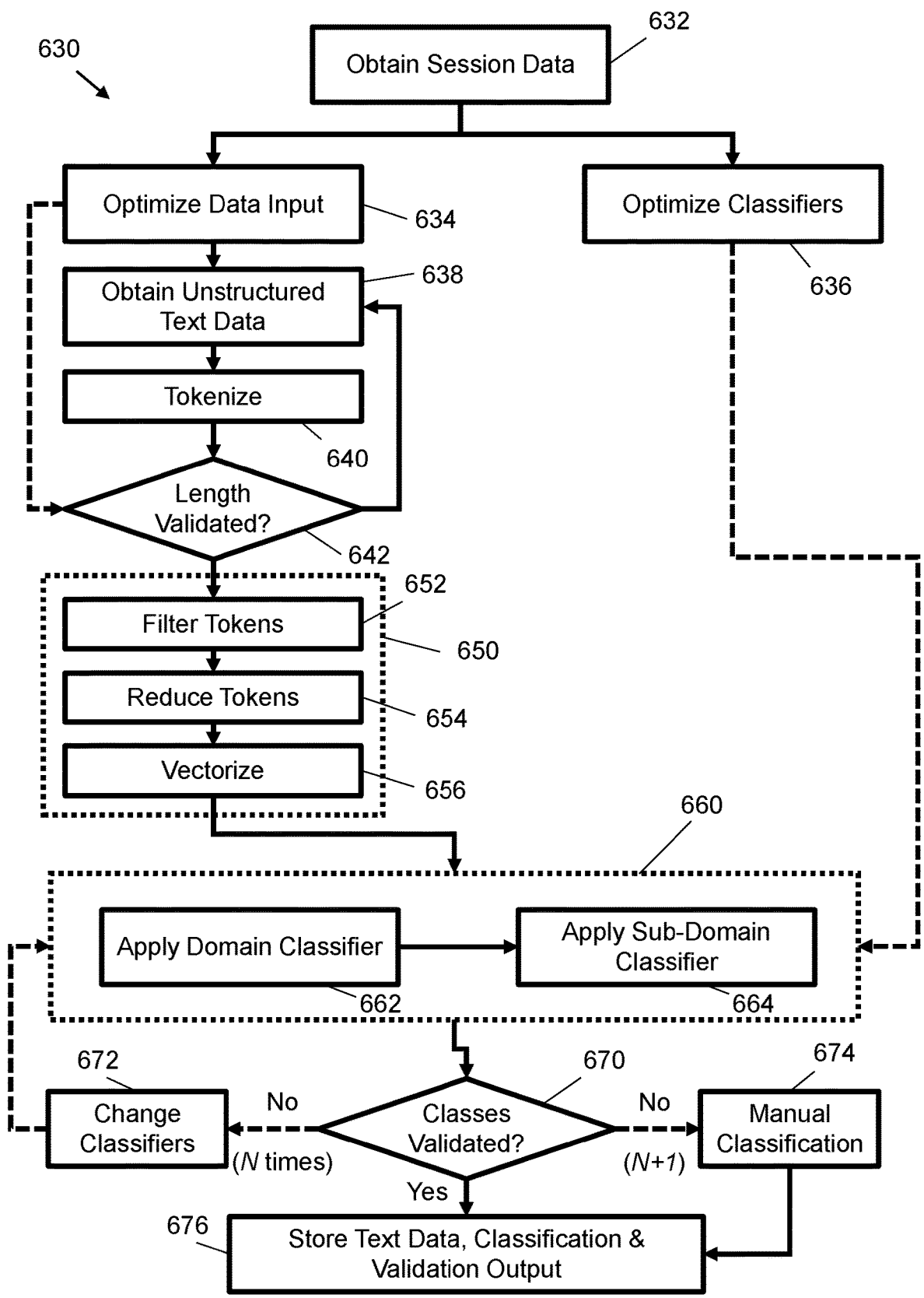

FIGS. 6A to 6C show a number of example methods of classifying unstructured text data. These methods may be implemented as instructions in computer program code that are loaded into memory and processed by a processor.

FIG. 6A shows a first method 600 of classifying unstructured text data. This method may be performed using the first example embodiment shown in FIG. 2A. At block 602, unstructured text data is obtained from a user. For example, this may involve a user typing the unstructured text data into a user input field using a physical or onscreen keyboard. It may also involve a user speaking to a voice assistant and having their utterance converted from speech to text using a known speech-to-text system. At block 604, the unstructured text data is pre-processed to provide a structured numeric representation of the unstructured text data. Pre-processing may be performed using the example pre-processing pipeline shown in FIG. 2B or using another pre-configured pipeline function available within machine learning programming libraries. At block 606, the structured numeric representation of the unstructured text data is mapped to one or more classes using at least one machine learning classifier. For example, this may comprise mapping an input one-dimensional array of processed token count values (with or without normalisation) to an output one-dimensional array of class elements. The output array may comprise a logit or probability vector wherein a highest value within the array corresponds to a most likely class that is selected as the determined class for the classification. For neural network architectures, one or more feed forward networks may be used before a final softmax layer to output a (pseudo) probability vector across the classes. The at least one machine learning classifier may be trained using a training set derived from pairs of unstructured text data and ground-truth or validated class labels.

FIG. 6B shows a second method 610 of classifying unstructured text data. The second method 610 is a method of hierarchical classification with additional validation loops. The second method 610 may incorporate features described with respect to FIGS. 4A to 4D, and may be implemented on a legal classification system as shown in FIG. 2C or 3B. At block 612, unstructured text data is obtained as per block 602 of FIG. 6A. At block 614, the unstructured text data is pre-processed to generate a structured numeric representation as per block 604 of FIG. 6A. At block 616, a domain classifier is applied to the structured numeric representation to determine a first parent classification (of a domain). In a legal application, domains may correspond to particular areas of law. At block 618, the output of the domain classifier is used to configure and apply a suitable sub-domain classifier to the same structured numeric representation generated at block 614. There may be a predefined mapping between a domain and a set of sub-domains (e.g., in a parent-child relationship). The sub-domains may comprise relevant sub-fields of law for the domain. Using the output of block 616, a most likely domain may be determined from a domain class vector (e.g., by taking the maximum argument—argmax—of the vector) and used to retrieve a set of parameters for the sub-domain classifier. At block 618 a sub-domain class is determined using the sub-domain classifier. At block 620, the domain and sub-domain classes are validated. This may be performed using the process shown in FIGS. 4A to 4D. Validation may comprise returning the output domain and sub-domain to the user and obtaining a validation user input from the user. If the domain is invalidated, the method returns to block 616. In the present case, an invalid class results in a different type of classifier being selected. As such, at each repetition of block 616, a different type of domain classifier is configured. In certain cases, a limit may be set to the number of repetitions. For example, a list of classifiers of different types may be provided as configuration data and on each repetition the next classifier type in the list may be selected. A similar process may be applied if the domain is validated but the sub-domain is invalidated. In this case, block 620 loops to block 618 and a sub-domain classifier of a different type is configured to perform the sub-domain classification. If the domain is validated, block 616 is not repeated. If the domain is invalidated, and block 616 is repeated, then block 618 may use iterate through sub-domain classifier types independently or in a synchronised manner with the domain classifier types. For example, if independent iteration is configured, then if a domain classifier of a second type is applied on a first iteration, then a sub-domain classifier of a first type may still be applied on the first iteration, with a sub-domain classifier of a second type being selected only if the domain is validated but the sub-domain is invalided. At block 620, if the domain and sub-domain are validated by the user, or if a predefined number of repetitions is reached, the method 610 continues to block 622 where the classification outputs from each of the domain and sub-domain classifiers on each iteration are stored, together with the validation data from the user and the unstructured text data obtained at block 612. This method thus enables a large quantity of useful training data to be quickly collected, where the validations (e.g., as a binary True/False field) allow positive and negative training examples to be provided. Certain classifier types may require negative and positive training examples, whereas others may just require positive training examples.

In one variation, e.g., using a process such as is shown in FIG. 4D, a text scenario 480 may be provided to a user as part of a validation process. In certain cases, a text scenario 480 may be provided instead of a manual selection stage as shown in FIG. 4C. For example, as part of validation, a user may be shown m (e.g., where m is ~2-6) text scenarios, where each scenario is generated and/or retrieved based on a particular domain and sub-domain combination. For example, the top k_d domains and the corresponding top k_sd sub-domains may be selected and a text scenario generated for each combination (e.g., where k_d and k_sd are small—such as between 1 and 3). For example, the top 2 domains and sub-domains may be selected (based on a probability or logit value) and 4 scenarios generated or retrieved based on the 4 domain-subdomain combinations. The user may be asked to select the scenario that is most applicable, or to indicate that no provided scenario is appropriate. The scenarios may be supplied as an ordered list for display on a user client device, where the ordering may be based on the probability or logit value (e.g., the most probably combination as indicated by a product of domain and sub-domain probabilities may be ranked and displayed first). If a scenario is selected by a user, the domain and sub-domain associated with that scenario may be validated (i.e., indicated as being confirmed or valid classifications by the user). If the user indicates that no provided scenario is appropriate, this may be taken as an invalidation of the domain and sub-domain and a further validation iteration may be undertaken. In any case, as described herein, validated classifications and scenarios may be saved as training data samples for iterative learning. The supply of a text scenario may be performed as part of validation of any of a set of multiple classifiers, and may be performed prior to the manual selection stage, where a manual selection stage may be performed if no scenarios are indicated as being valid.

In certain examples, as part of an invalidation, a user may also provide supplementary data. Supplementary data may be paired with existing session data and the unstructured text data and stored as part of a training sample. The supplementary data may comprise a further set of unstructured text data. The supplementary data may, in certain cases, be combined with the original unstructured text data, e.g., to make a larger query that leads to a more complete structured numeric representation to make further classifications. These classifications may be used internally (e.g., only as part of training) and/or may form part of the iterative classification loops. In certain cases, training samples that are stored may be further evaluated (e.g., offline) for manual cleaning and/or preparation of a suitable training set for one or more classifiers.

FIG. 6C shows a third method 630 of classifying unstructured text data. In this case, data input and classifier optimization are performed to further increase the accuracy of a final classification. The third method 630 may be performed using the legal classification system shown in FIG. 3B and the components shown in FIGS. 4A to 4D and 5.

At block 632, session data for the legal query is obtained. This may be obtained as described for session data 330 in FIGS. 3A and 3B. In one case, the session data may comprise user account data and one or more selections from a sequence of pre-query lists. As such, the session data may comprise selections by the user of a sequence of field values from a respective sequence of defined field value sets. For example, a status, role and outcome sought by a user may be selected as one item from each of three lists of possible items. The lists of possible items may be order-ranked based on a frequency analysis of a database of training data and/or previously selected items in the sequence of selections during the session. At block 634, the session data is used to optimize further input obtained from the user and at block 636 to optimize the classifiers that are applied in later blocks. In the present case, the further input optimized at block 634 comprises at least unstructured text data that is obtained from the user at block 640. In this case, a minimum token count or input length is determined at block 634 based on the session data obtained at block 632. For example, block 634 may comprise determining a minimum token count for the unstructured text data based on at least the session data and a database of training data for the at least one machine learning classifier. As described with reference to previous examples, tokens may be approximately equal to words. At block 638, the unstructured text data is obtained from the user and, at block 640, the unstructured text data is tokenized in an initial pre-processing step. At block 642, the number of tokens in the currently received set of unstructured text data is compared with the minimum token count. If the minimum token count is not yet reached, the method 630 loops back to block 638. This loop may involve informing the user via a user interface that the minimum token count is not yet reached. The loop continues until the minimum token count at which point the method proceeds from block 642 to further pre-processing at block 650.

The further pre-processing at block 650 resembles the pre-processing described with reference to the example of FIG. 2B. At sub-block 652, the tokens from the tokenizer 640 are filtered. This may comprise removing stop tokens and number tokens. At sub-block 654, the filtered tokens are reduced. This may comprise applying one of a stemming function and a lemmatization function to the set of tokens. In a preferred example, a stemming function is applied. This sub-block may reduce the number of tokens by matching multiple tokens with a single reduced token form (a stem or root). At sub-block 656, the reduced set of tokens are vectorized. This may comprise matching tokens with entries in a predefined vocabulary data structure and then determining, within the set of reduced tokens derived from the input unstructured text data, the frequency or counts of the matching tokens. In this case, the length of the resulting vector may be the length of the vocabulary data structure. In certain cases, the frequency or count values may be normalised, e.g., based on a total number of reduced tokens and/or using a TF-IDF computation. The output of sub-block 656 is a structured numeric representation of the legal query as input at block 638. It should be noted that although in this method the minimum token count is determined based on tokens output by the initial tokenization at block 638, the minimum token count may alternatively be determined in relation to any of the outputs of sub-blocks 652, 654 and 656 (e.g., it may comprise a total count for the vector output at sub-block 656).

Following further pre-processing at block 650, the third method 630 moves to classification at block 660. In the present case, block 650 involves mapping the structured numeric representation of the unstructured text data to one or more classes using at least one machine learning classifier. In the third method 630, block 660 is configured based on the output of block 636, i.e., the machine learning classifiers are configured based on configuration data that is generated based on the initial session data obtained at block 632. Block 636 may comprise rule-based processing to determine whether one or more domain and sub-domain classes are not applicable, and therefore may be inhibited for the classification at block 650. This may restrict the number of possible classes and thus reduce classification error.

In the present example, hierarchical classification is performed as per FIGS. 2C and 3B. As such, the classification at block 660 comprises application of a domain classifier at sub-block 662 and application of a sub-domain classifier at sub-block 664. The output of the domain classification at sub-block 662 is used at sub-block 664, together with configuration data from block 636, to select a suitable sub-domain classifier.

Following classification at block 660, the third method 630 proceeds to block 670 where the output classes are validated. This may comprise a process similar to that described in at least FIGS. 4A to 4C. The first implementation of block 660 may involve mapping the structured numeric representation to a set of applicable domain and sub-domain classes using a first machine learning classifier of a first type. The first machine learning classifier may comprise a logistic regression classifier and may be parameterised with different parameter sets for each of the domain and sub-domain classifications at blocks 662 and 664. These parameter sets may result from a training procedure performed before the method 630 is implemented. At block 670, responsive to the validating indicating an invalid set of classes, the method 630 proceeds to block 672 where one or more of the domain and sub-domain classifiers are changed. If the domain class is validated but the sub-domain class is not validated then only the sub-domain classifier may be changed. If the domain class is invalidated, then both the domain and sub-domain classifier may be changed. Changing the classifiers may comprise loading or otherwise instantiating one or more of domain and sub-domain classifiers based on a second machine learning classifier of a second type. The second machine learning classifier may comprise a linear support vector machine. Following block 672, block 660 is performed again, including performing one or more of sub-blocks 662 and 664 based on the validation. A new set of classes are thus determined, and these are again validated at block 670. In certain cases, if the sub-domain is invalidated, the domain is automatically set as invalidated given their parent-child relationship.

The validation loop indicated by blocks 660, 670 and 672 may be repeated a configurable number of times (shown as N in FIG. 6C). In test cases, N=1 was found suitable to obtain a correct classification 95% of the time. If, at block 670, at least the sub-domain is not validated N times (e.g., on iteration N+1) then the method 630 proceeds to block 674 where a manual classification is performed. This involves receiving, from the user, data indicating a manual selection of the classes from a pre-defined set of classes. The manual selection may be obtained for whatever classes are not validated (e.g., one or more of invalidated domain and sub-domain classes).

If the classes are validated at block 670, or if manual selection of classes is obtained at block 674, then the third method proceeds to block 676. Here the classes as determined by a validated classification or the manual selection are provided as the output of the legal classification system (e.g., as a final domain and sub-domain). At block 676, outputs from one or more of the machine learning classifiers applied at block 660, or the manual selection if applied, and at least one of the unstructured text data and the structured numeric representation of the unstructured text data are stored in a database of training data. This database may be used to periodically train the classifiers.

Training the classifiers may comprise a number of operations. At a first block, training data may be obtained comprising text-output data samples. The training data may be obtained from the database described above. Initially, samples in the training database may be manually labelled, e.g., by performing the third method 630 with randomly initialised classifiers. Each text-output data sample may comprise at least one of unstructured text data and a structured numeric representation of the unstructured text data as input data and domain and sub-domain classifications as output data. If unstructured text data is stored, then blocks 640 and 650 may be performed during training to convert this into a corresponding structured numeric representation for inference by the classifiers. The text-output data samples may be split into validated text-output data samples (e.g., those that have been validated at block 670 or manually selected at block 674) and invalidated text-output data samples (e.g., based on validation data received from one or more users at block 670). Training may then comprise determining a first set of parameters for a domain classification by training the multiple machine learning models used during the iterations using the domain classifications as output for the training data. Training may also involve determining a second set of parameters by training the multiple learning models using the sub-domain classifications as output for the training data. Each machine learning model may be trained separately using the same training data.

In certain cases, the determining of the first and/or second sets of parameters, i.e., training the classifiers, is performed responsive to a set of new text-output data samples in the training data exceeding a pre-defined threshold. For example, the pre-defined threshold may be 1500 new legal queries that run through the third method 630 of FIG. 6C. In this manner, classification accuracy may be improved over time as part of a bootstrapped process.

In one case, responsive to a successful validation of a domain class and a sub-domain class, additional unstructured text data is obtained based on the domain class and the sub-domain class. In one case, this may be obtained as optional user feedback. In these, or alternative, cases it may be obtained by validating, using validation data received from the user, additional unstructured text data that is generated based on a set of validated domain and sub-domain classes. This additional unstructured text data may be generated using a generative machine learning model. It may be used to confirm the domain class and the sub-domain class. In one case, the additional unstructured text data may be added to the initial unstructured text data obtained at block 638 to provide an expanded training data sample for training and/or used as an auxiliary training data sample. In this manner, the training data may be enhanced.

Example Data

Figure 7E:
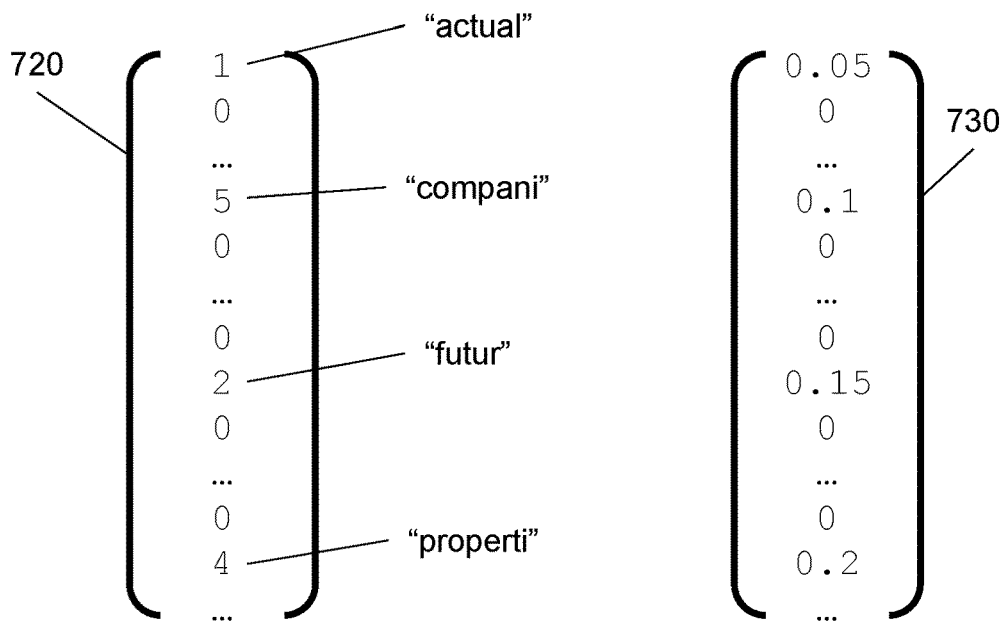

FIGS. 7A to 7F show example data for one test implementation of the present examples. FIG. 7A shows an example 700 of at least a portion of legal query as supplied as unstructured text data. In this case, the unstructured text data is stored as a long string and may be received as part of a JSON request from a client-based user interface. FIG. 7B then shows an example output 710 following initial text pre-processing (e.g., following at least tokenizer 230 and token filter 232 or one or more of blocks 640 and 652). The text pre-processing generates a list of tokens (the spaces in FIG. 7B indicate different list slots and the tokens are shown as their constituent characters). In this case, the text pre-processing comprises normalization in the form of removal of stop tokens and number tokens and application of a stemming function. FIG. 7C shows a first example structured numeric representation 720 in the form of a count or frequency vector of tokens that are present in a vocabulary data structure (i.e., a one-dimensional array or tensor). This may represent the output of the vectorization component 236 or block 656. For clarity, only certain portions of the complete representation are shown. Different elements of the vector are labelled to indicate the tokens that relate to the elements. For example, the reduced token "compani" occurs five times in the example output 710 and so has a count of "5" in the vector. FIG. 7D shows a modified vector following an optional normalization process performed on the vector 720 in FIG. 7C (such as TF-IDF), where the elements are scaled to a normalised value between 0 and 1.

FIG. 7E shows an example training data sample 750 that may be stored in the database of training samples (e.g., following the method of FIG. 6C or the application of the system of FIG. 3B and the validation loop of FIGS. 4A to 4D). It should be noted that different implementations may store different portions of data and not all of the data shown in FIG. 7E may be stored in different implementations; the example is more exhaustive to provide a demonstration of the form a training sample may take. The example training data sample 750 comprises: session data 752 that is received prior to the classification; the original unstructured text data 754; a count 756 of the tokens present in the original unstructured text data 754; the structured numeric representation (text vector) 758 that is generated from the unstructured text data 754 by text pre-processing; domain validation data 760 indicating the result of a domain validation loop; sub-domain validation data 762 indicating the result of a sub-domain validation loop; and a reference to a validated text scenario (the text for this scenario being stored in another record). In this example, the domain and sub-domain validation data 760, 762 comprises a list reflecting the validation iterations, e.g. [{C: 0, D: contract_law, V: F}, {C: 1, D: family_law, V: T}], where C indicates a classifier identifier (and M=manual selection), D indicates the output domain or sub-domain classification, and V is a boolean field indicating whether validation is successful (indicated by True or False). Other formats may be used in other examples. The count 756 may be computed as part of the text pre-processing and used by the token count processor, along with the validated domain and sub-domain, to determine a minimum token count as described herein.

Lastly FIG. 7F shows an example of selection option data 750 (such as 354 in FIG. 3B). This example may form part of a JSON reply.

Example Instructions for a Computer Readable Medium

Certain examples described herein may be implemented via instructions that are stored within a non-transitory computer-readable storage medium. For example, the above methods may be implemented by a server computing device such as 130 as shown in FIG. 1. Certain blocks may also be implemented by a client computing device such as 110 as shown in FIG. 1.

Figure 8A:
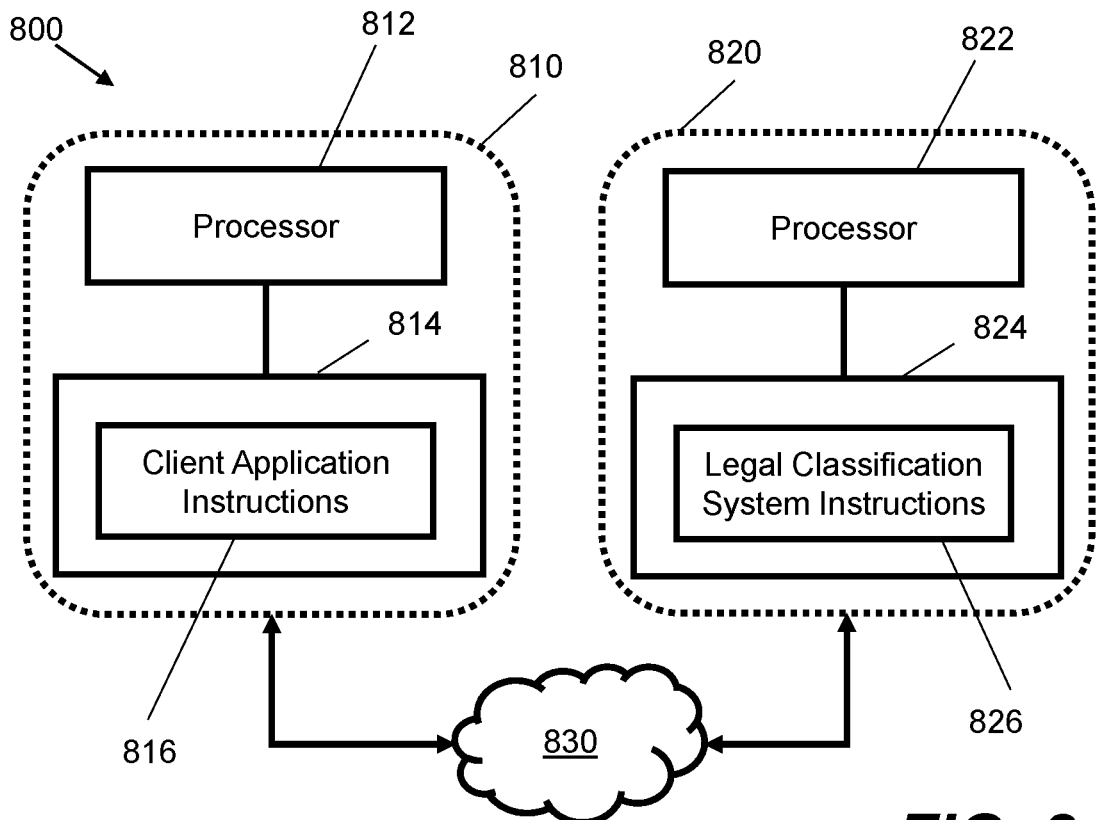
FIGS. 8A and 8B are schematic diagrams showing different examples of non-transitory computer-readable storage media storing instructions for implementing an example legal classification system.

FIG. 8A shows a further example of a distributed computing system 800 comprising a client computing device 810 and a server computing device 820. These may respectively implement the devices 110 and 130 in FIG. 1. At least the server computing device 820 may implement the legal classification systems 200 and 300 shown in FIGS. 2A to 2C and 3A to 3B. The server computing device 820 may implement any one of the methods of FIGS. 6A to 6C. The client computing device 810 comprises at least one processor 812 that is communicatively coupled to a non-transitory computer-readable storage medium 814. The computer-readable storage medium 814 stores a set of instructions 816 to implement a client application. The client computing device 810 is communicatively coupled to the server computing device 820 via one or more computer networks. The server computing device 820 also comprises at least one processor 822 that is communicatively coupled to another non-transitory computer-readable storage medium 824. The computer-readable storage medium 824 stores a set of instructions 826 to implement a legal classification system, such as any of the systems described herein. The non-transitory computer readable mediums may comprise one or more of a rotating magnetic disk, a rotating optical disk, a flash random access memory (RAM) chip, and other mechanically moving or solid-state storage media. In use, the instructions are executed by one or more of the processors 812 and 822 cause said processor to perform the operations described above.

Figure 8B:
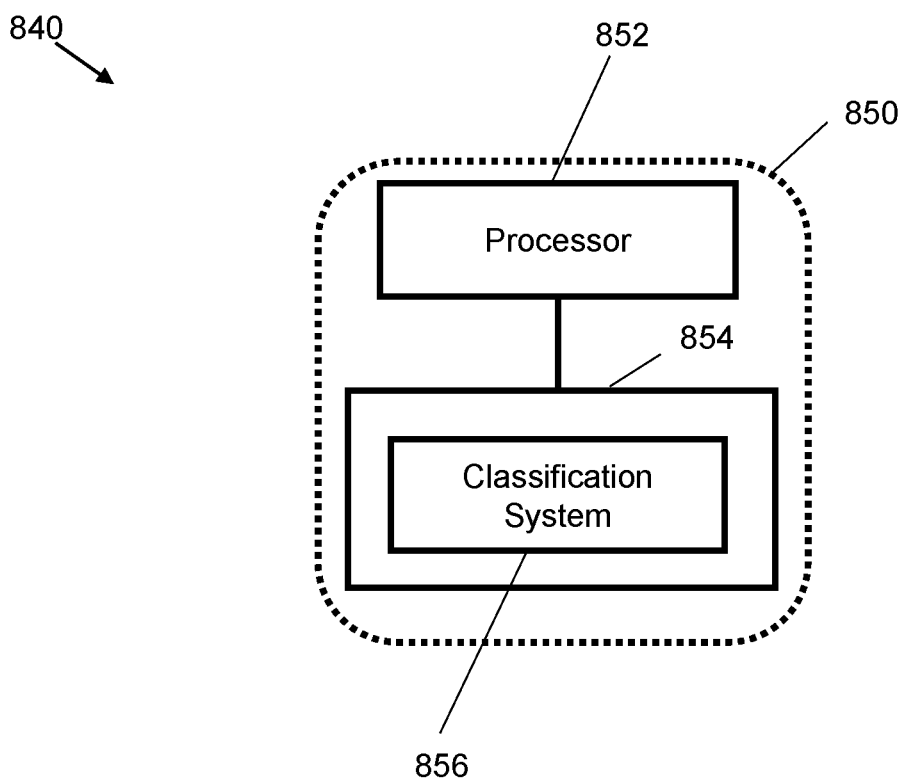

FIG. 8B shows an example 840 of a local implementation of the methods and systems described herein on a single computing device 850. In this case, a classification system as described in one or more of the previous examples may operate solely from the computing device 850. For example, the legal classification systems 200 and 300 of any of FIGS. 2A to 3B may be implemented upon the single computing device 850. In FIG. 8B, the computing device 850 comprises at least one internal processor 852 and a computer-readable storage medium 854 storing a set of instructions 856 to implement the classification system. The instructions may form part of an application that is implemented on the computing device 850, e.g., in association with one or more machine learning processing chips. In other cases, the computing device 850 may comprise a dedicated computing device where the logic described herein is implemented via appropriately programmed Field Programmable Gate Arrays (FPGAs) or Application Specific Integrated Circuits (ASICs).

The above embodiments, variations and examples are to be understood as illustrative. Further embodiments, variations and examples are envisaged. Although certain components of each example have been separately described, it is to be understood that functionality described with reference to one example may be suitably implemented in another example, and that certain components may be omitted depending on the implementation. It is to be understood that any feature described in relation to any one example may be used alone, or in combination with other features described, and may also be used in combination with one or more features of any other of the examples, or any combination of any other of the examples. For example, features described with respect to the system components may also be adapted to be performed as part of the described methods. Furthermore, equivalents and modifications not described above may also be employed without departing from the scope of the invention, which is defined in the accompanying claims.

The invention claimed is:

1. A system for classification of unstructured text data relating to a legal query, the system comprising:
   a session interface to receive session data relating to the legal query;
   a text interface to receive unstructured text data from a user;
   a text pre-processor to apply one or more text pre-processing functions to the unstructured text data to output a structured numeric representation of the unstructured text data;
   at least one machine learning classifier to map the structured numeric representation of the unstructured text data to one or more classes within a defined set of classes;
   a classifier optimizer to process the session data to generate configuration data for the at least one machine learning classifier, the configuration data indicating a subset of the defined set of classes that are valid given the session data;
   a database of training data for the at least one machine learning classifier;
   a token count processor to determine a minimum token count for the unstructured text data based on at least the session data and data stored within the database of training data; and
   a data input optimizer to validate the unstructured text data received at the text interface prior to application of the at least one machine learning classifier,
   wherein the at least one machine learning classifier is applied responsive to the length of the unstructured text data exceeding the minimum token count.

2. The system of claim 1, wherein the session data comprises selections by the user of a sequence of field values from a respective sequence of defined field value sets, and wherein the data input optimizer is configured to order values within each of the defined field value sets based on the database of training data.

3. The system of claim 1, wherein the session data indicates one or more of:
   a user account type;
   a legal query role;
   a legal query status; and
   a desired legal query outcome.

4. A system for classification of unstructured text data relating to a legal query, the system comprising:
   a session interface to receive session data relating to the legal query;
   a text interface to receive unstructured text data from a user;
   a text pre-processor to apply one or more text pre-processing functions to the unstructured text data to output a structured numeric representation of the unstructured text data;

at least one machine learning classifier to map the structured numeric representation of the unstructured text data to one or more classes within a defined set of classes, wherein the at least one machine learning classifier comprises a first machine learning classifier and a second machine learning classifier;

a classifier optimizer to process the session data to generate configuration data for the at least one machine learning classifier, the configuration data indicating a subset of the defined set of classes that are valid given the session data; and a validation engine to receive validation data associated with a validation of the one or more classes as determined by a first classification applied by the first machine learning classifier, wherein, responsive to receiving validation data indicating an invalid set of classes for the first classification, the validation engine is configured to instruct the second machine learning classifier to perform a second classification, and wherein the validation engine is configured to perform a validation of the classes determined by the second classification.

5. The system of claim 4, comprising:

a manual classification interface to receive data indicating a manual selection of the classes from the defined set of classes by the user, wherein, responsive to receiving data from the user indicating an invalid set of classes for the second classification, the validation engine is configured to present the user with at least a subset of the defined set of classes for manual selection; and a data storage device to store outputs from one or more of the first machine learning classifier, the second machine learning classifier and the manual classification interface and at least one of the unstructured text data and the structured numeric representation of the unstructured text data as training data for one or more of the first and second machine learning classifiers.

6. The system of claim 4, wherein the first machine learning classifier is of a first type and the second machine learning classifier is of a second type, the first and second types being different.

7. The system of claim 6, wherein the first machine learning classifier is a logistic regression classifier, and the second machine learning classifier is a support vector machine classifier.

8. The system of claim 4, wherein the session data indicates one or more of:

a user account type;
a legal query role;
a legal query status; and
a desired legal query outcome.

9. A system for classification of unstructured text data relating to a legal query, the system comprising:

a session interface to receive session data relating to the legal query;

a text interface to receive unstructured text data from a user;

a text pre-processor to apply one or more text pre-processing functions to the unstructured text data to output a structured numeric representation of the unstructured text data;

at least one machine learning classifier to map the structured numeric representation of the unstructured text data to one or more classes within a defined set of classes; and a classifier optimizer to process the session data to generate configuration data for the at least one machine learning classifier, the configuration data indicating a subset of the defined set of classes that are valid given the session data, wherein the at least one machine learning classifier comprises a domain machine learning classifier and a sub-domain machine learning classifier, the domain and sub-domain machine learning classifiers being of a common type and each receiving the structured numeric representation of the unstructured text data, wherein parameters for the sub-domain machine learning classifier are loaded based on a domain class output by the domain machine learning classifier.

10. A system for classification of unstructured text data relating to a legal query, the system comprising:

a session interface to receive session data relating to the legal query;

a text interface to receive unstructured text data from a user;

a text pre-processor to apply one or more text pre-processing functions to the unstructured text data to output a structured numeric representation of the unstructured text data;

at least one machine learning classifier to map the structured numeric representation of the unstructured text data to one or more classes within a defined set of classes;

a classifier optimizer to process the session data to generate configuration data for the at least one machine learning classifier, the configuration data indicating a subset of the defined set of classes that are valid given the session data, wherein the one or more text pre-processing functions comprise:

a tokenizer to parse the unstructured text data as a sequence of character data symbols and to output data indicating one or more groups of character data symbols, and one or more of:

a stemming function to map a plurality of tokens from the tokenizer to at least single stem token;

a lemmatization function to map a plurality of tokens from the tokenizer to at least single grammar unit token;

a stop token removal function to remove one or more tokens from the tokenizer that are defined in a data structure of stop tokens; and a character filter to remove character data symbols that match a predefined set of character data symbols, wherein at least the tokenizer is configured to:

partition the unstructured text data into sets of grouped character symbols based on one or more punctuation character symbols;

match sets of grouped character symbols against entries in a dictionary data structure; and replace matched sets of grouped character symbols with a numeric value representing an index in the dictionary data structure.

11. The system of claim 10, wherein the text pre-processor is configured to output a bag of words vector for the unstructured text data indicating frequencies of matched sets of grouped character symbols and perform a term frequency inverse document frequency (TF-IDF) computation to output a TF-IDF vector;

optionally comprising a dimensionality reduction component configured to receive the TF-IDF vector and to reduce a size of the vector.

12. A method of classifying unstructured text data relating to a legal query, the method comprising:
receiving session data for the legal query from a user;
processing the session data to determine configuration data for at least one machine learning classifier, the configuration data indicating a subset of a defined set of classes that are valid given the session data;
receiving unstructured text data from the user;
pre-processing the unstructured text data to provide a structured numeric representation of the unstructured text data;
configuring at least one machine learning classifier using the configuration data; and
mapping the structured numeric representation of the unstructured text data to one or more classes using the at least one machine learning classifier, wherein the session data comprises selections by the user of a sequence of field values from a respective sequence of defined field value sets, and the method comprises, prior to receiving the unstructured text data from the user:
determining a minimum token count for the unstructured text data based on at least the session data and a database of training data for the at least one machine learning classifier,
wherein at least one of the pre-processing and mapping are only performed once the unstructured text data is determined to contain a number of tokens that is above the minimum token count.

13. The method of claim 12, wherein said mapping is performed using a first machine learning classifier of a first type and the method further comprises:
validating, using validation data, the classes as determined by the first machine learning classifier;
responsive to the validating indicating an invalid set of classes:
mapping the structured numeric representation of the unstructured text data to one or more classes using a second machine learning classifier of a second type, the second type being different to the first type, and
validating, using validation data, the classes as determined by the second machine learning classifier;
responsive to the validating indicating an invalid set of classes as determined by the second machine learning classifier:
receiving, from the user, data indicating a manual selection of the classes from a pre-defined set of classes;
outputting the classes as determined by a validated first or second classification or the manual selection; and
storing outputs from one or more of the first machine learning classifier, the second machine learning classifier and the manual selection and at least one of the unstructured text data and the structured numeric representation of the unstructured text data in the database of training data.

14. The method of claim 13, comprising:
parameterising each of the first and second machine learning classifiers with a first set of parameters to provide a mapping to a set of domain classes; and
parameterising each of the first and second machine learning classifiers with a second set of parameters to provide a mapping to a set of sub-domain classes, wherein the second set of parameters are selected based on an output of the mapping to the set of domain classes.

15. The method of claim 14, comprising:
responsive to a successful validation of a domain class and a sub-domain class, generating unstructured text data based on the domain class and the sub-domain class; and
validating, using validation data received from the user, the unstructured text data to confirm the domain class and the sub-domain class.

16. The method of claim 14, comprising:
obtaining training data comprising text-output data samples, each text-output data sample comprising at least one of unstructured text data and a structured numeric representation of the unstructured text data as input data and domain and sub-domain classifications as output data, wherein the text-output data samples are split into validated text-output data samples and invalidated text-output data samples based on validation data received from one or more users;
determining the first set of parameters by training the first and second machine learning classifiers using the domain classifications as output for the training data; and
determining the second set of parameters by training the first and second machine learning classifiers using the sub-domain classifications as output for the training data.

17. The method of claim 16, wherein the determining of one or more of the first and second sets of parameters is performed responsive to a set of new text-output data samples in the training data exceeding a pre-defined threshold.

* * * * *